United States Patent [19]
Namoto et al.

[11] Patent Number: 5,657,303
[45] Date of Patent: Aug. 12, 1997

[54] TILT SENSOR, OPTICAL DISK, AND TILT COMPENSATING METHOD FOR PERFORMING A STABLE TILT COMPENSATING CONTROL, AND APPARATUS UTILIZING THE SAME

[75] Inventors: Yoshiteru Namoto, Ikoma; Masayuki Shinoda, Katano; Yoshihiro Mushika, Neyagawa, all of Japan

[73] Assignee: Matsushita Electric Industrial Co., Ltd., Kadoma, Japan

[21] Appl. No.: 550,567

[22] Filed: Oct. 31, 1995

[30] Foreign Application Priority Data

Oct. 31, 1994 [JP] Japan ................................ 6-267175
Apr. 6, 1995 [JP] Japan ................................ 7-080932

[51] Int. Cl.$^6$ ........................................................ G11B 7/095
[52] U.S. Cl. ............................ 369/44.32; 369/54; 369/58; 369/100
[58] Field of Search ........................ 369/44.32, 44.23, 369/44.24, 118, 13, 54, 58, 44.14, 112, 44.26, 100

[56] References Cited

U.S. PATENT DOCUMENTS

| 4,694,442 | 9/1987 | Gijzen et al. | 369/44 |
| 4,780,865 | 10/1988 | Yamakawa | 369/44.32 |
| 5,056,075 | 10/1991 | Maruta et al. | |
| 5,216,649 | 6/1993 | Koike et al. | 369/44.32 |
| 5,442,615 | 8/1995 | Ohsato et al. | 369/44.32 |
| 5,483,512 | 1/1996 | Yanagawa | 369/44.32 |

FOREIGN PATENT DOCUMENTS

| 312105A | 4/1989 | European Pat. Off. |
| 56-145530 | 11/1981 | Japan |
| 59-152530 | 8/1984 | Japan |
| 59-198538 | 11/1984 | Japan |
| 61-160844 | 7/1986 | Japan |
| 2-189732 | 7/1990 | Japan |
| 2218027 | 8/1990 | Japan |
| 313864 | 3/1991 | Japan |
| 4328332 | 11/1992 | Japan |

*Primary Examiner*—Thang V. Tram
*Attorney, Agent, or Firm*—Renner, Otto, Boisselle, Sklar

[57] ABSTRACT

According to the present invention, an apparatus for optically performing recording of information and/or reproduction of information for an optical disk having a recording surface is provided. The apparatus includes: an optical pickup for forming a first light spot on the recording surface; a tilt sensor, arranged to be transported with the optical pickup, for detecting a tilt of the optical disk with respect to an optical axis of the optical pickup by forming a second light spot on the recording surface; and a tilt compensating mechanism for angularly adjusting the optical pickup to eliminate the tilt. In this apparatus, the second light spot is formed at such a position that a line between the first and second light spots is inclined to a direction perpendicular to the radial direction of the optical disk. This prevents the second light spot from entering mirror regions having no pits or no grooves, even when the first light spot is located on the inner circumference of an information recording region having pits or grooves or on the outer circumference of the information recording region.

4 Claims, 12 Drawing Sheets

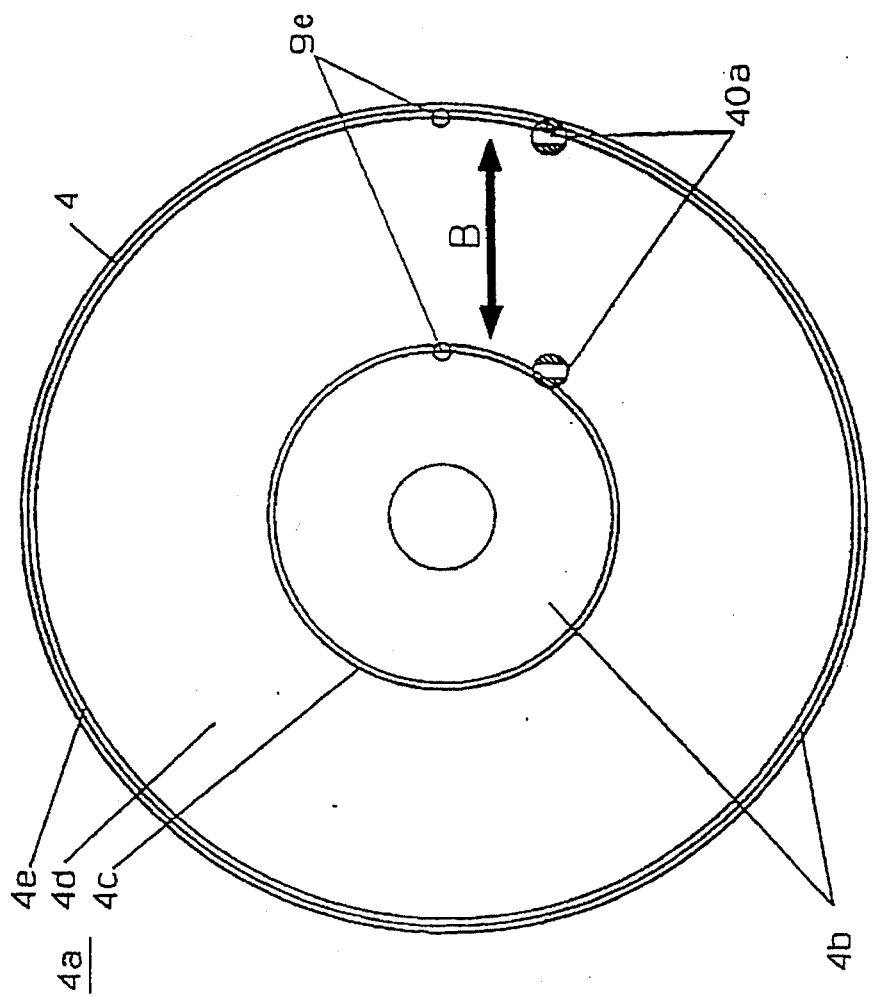
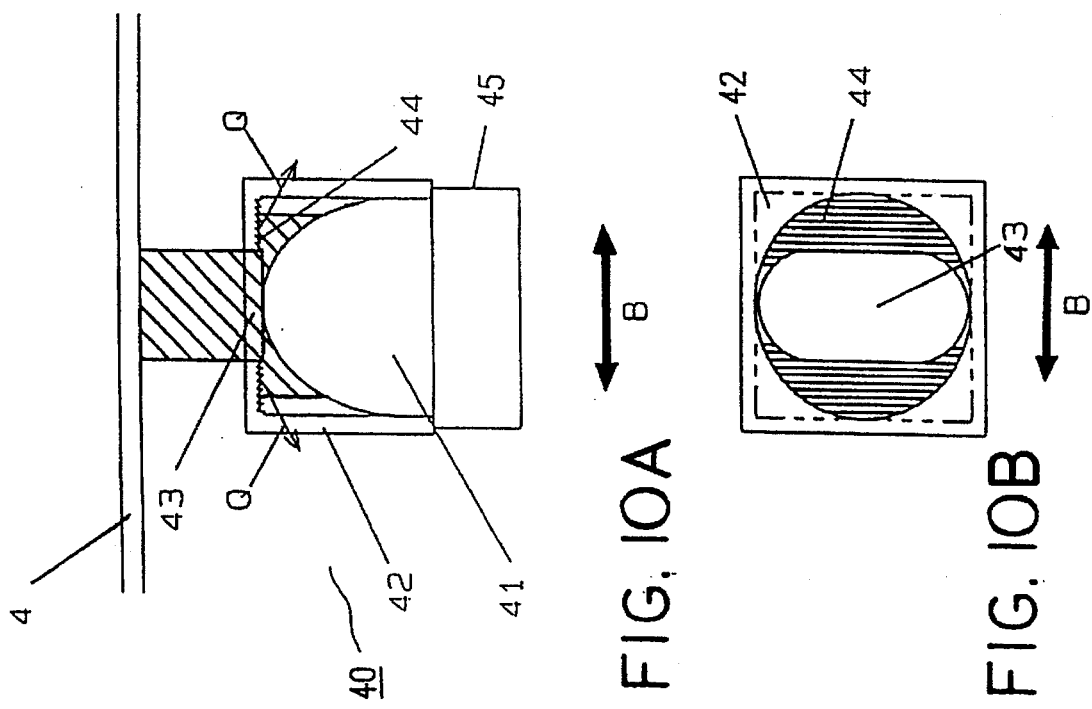
FIG. 11
FIG. 10A
FIG. 10B

TILT SENSOR, OPTICAL DISK, AND TILT COMPENSATING METHOD FOR PERFORMING A STABLE TILT COMPENSATING CONTROL, AND APPARATUS UTILIZING THE SAME

BACKGROUND OF THE INVENTION

1. Field of the Invention:

The present invention relates to an apparatus for performing recording of information and/or reproduction of information for an optical disk while detecting a tilt angle of the optical disk by using a tilt sensor, thereby performing a tilt compensation control, and also relates to a tilt sensor, a tilt compensation method and a disk structure which are used for accomplishing such a purpose.

2. Description of the Related Art:

If an optical disk, onto/from which information is recorded/reproduced, is warped, then a light beam emitted from an optical pickup is not vertically incident onto a recording surface of the optical disk, thereby causing deterioration in the recording/reproducing signal. The deterioration becomes serious in a high-density optical information recording and reproducing apparatus using en objective lens having a large numerical aperture (NA). In order to prevent such deterioration, for example, Japanese Laid-Open Patent Publications Nos. 61-160844 and 4-328332 disclose an apparatus for performing optical recording of information and/or optical reproduction of information for the optical disk (hereinafter, referred to as an optical information recording and reproducing apparatus) in which a tilt sensor for detecting a tilt angle of the recording surface of an optical disk with respect to an optical axis of an optical pickup is provided. In these patent publications, while performing a tilt compensation control for angularly adjusting an optical pickup so that the output value of the tilt sensor falls within a predetermined range, the recording of information and/or the reproduction of information are/is performed.

A widely used tilt sensor includes: a light-emitting diode functioning as a light source; a photodiode having two light receiving sections (hereinafter, referred to as a two-divided photodiode) and functioning as a pair of light receiving elements; and an aspheric lens formed on the light-emitting side of the light source in order to substantially collimate the light emitted from the light source, all of these components being integrally formed so as to form the tilt sensor. The collimated light beam emitted from the tilt sensor is reflected by the recording surface of the optical disk. The reflected light is detected by the two-divided photodiode of the tilt sensor and the differential signal obtained from the outputs of the light receiving sections of the photodiode is used as a tilt compensation signal. In general, the gain of the tilt sensor is adjusted so that the output of the differential signal of the tilt sensor becomes zero when the recording surface of the optical disk is vertical to the optical axis of the optical pickup.

A conventional tilt sensor is disclosed in Japanese Laid-Open Patent Publication No. 2-218027, for example. FIG. 16 shows the configuration of such a conventional tilt sensor 101. The tilt sensor 101 is mounted on a flexible substrate 103 and is electrically connected with a tilt compensation circuit (not shown). through the flexible substrate 103. The flexible substrate 103 is attached and fixed on the upper surface of a metal leaf spring 104 so that the tilt sensor 101 faces an optical disk 102. The metal leaf spring 104 is fixed on a base 105 of the optical pickup by fastening a fixing screw 106, thereby fixing the tilt sensor 101 on the base 105.

In assembling the tilt sensor 101, after performing a zero-point offset adjustment for adjusting the gain of the tilt sensor 101 so that the differential output between the pair of light receiving elements becomes zero when the light reflected by an optical disk 102 in an ideal state (i.e., a standard disk having no warp) is received by the light receiving elements, the tilt sensor is fixed on the base 105. This adjustment can be performed by fastening or loosening an adjusting screw 107. By fastening or loosening the adjusting screw 107, the metal leaf spring 104 is deflected between the positions 104a and 104b indicated by the broken lines in FIG. 16, and therefore the tilt sensor 101 moves between the positions 101a and 101b. The tilt sensor 101 is attached to the base 105 after adjusting the angle formed between the tilt sensor 101 and the recording surface of the optical disk 102 within the range of θ1 to θ2 by deflecting the metal leaf spring 104 so that the differential output becomes zero.

By implementing the tilt sensor in such a configuration, the zero-point offset adjustment can be performed in which the outputs of the pair of light receiving elements can be equalized when the light reflected by the unwarped optical disk 102 is received by the pair of light receiving elements, and than the attachment angle of the tilt sensor 101 is adjusted so that the differential output between the pair of light receiving elements becomes zero.

Next, referring to FIG. 17, the positional relationship between light spots formed on the recording surface of the optical disk by the optical pickup and the tilt sensor will be described.

The optical disk 102 includes: an information recording region 102a in which pits or grooves ere formed; and mirror portions 102b which include no pits or grooves and ere disposed on the inner side and the outer side thereof. The information recording region 102a consists of: a read-in region 102c; a program region 102d; and a read-out region 102e. In general, a directory for managing the information stored in the program region 102d exists in the read-in region 102c, and therefore the optical pickup first moves to read the directory. The read-out region 102e is provided for preparing for the case where the optical pickup is moved out of the program region 102d by mistake. In such a case, the optical pickup reads the address of the read-out region 102e, thereby returning the optical pickup to the program region 102d. Therefore, the optical pickup usually moves within the read-in region 102c and the program region 102d.

The center of the light spot 110a formed by the light beam emitted from the tilt sensor 101 is deviated from the center of the light spot 105a formed by the light beam emitted from the optical pickup toward a direction substantially perpendicular to the radial direction B of the optical disk. It is desired that the center of the optical axis of the optical pickup accords with the center of the optical axis of the tilt sensor 101. However, in order to avoid e mechanical interruption among the tilt sensor 101 and the components of the optical pickup, such as the objective lens and an objective lens actuator, some deviation occurs. Therefore, the center of the light spot 110a is deviated from the center of the light spot 105a.

As also shown in FIG. 17, the light spot 110a is deviated from the direction perpendicular to the direction B to a slightly inner side with respect to the center of the light spot 105a so that the light spot 110a is actually located on the same track where the light spot 105a is located. This is because it is considered that a more precise tilt compensation can be performed if the center of the light spot 110a is located on the same track where the light spot 105a is located. However, since the deviation of the light spot 110a from the direction perpendicular to the direction B is very small, the light spot 110a can be regarded to be deviated from the light spot 105a in a direction substantially vertical to the direction B.

The typical diameter of the light beam emitted from the tilt sensor 101 becomes as large as 5 mm. Therefore, in the case of arranging the light spots 105a and 110a at such positions, when the light spot 105a is located on the innermost circumference of the read-in region 102c of the information recording region 102a as shown in FIG. 17, a part of the light spot 110a possibly enters the mirror portion 102b. Similarly, when the light spot 105a is located on the outermost circumference of the program region 102d of the information recording region 102a, a part of the light spot 110a possibly enters the mirror portion 102b.

Since the light beam which has been emitted from the tilt sensor 101 and reflected by the information recording region 102a is diffracted by the pits or the grooves of the information recording region 102a, the amount of the light received by the light receiving elements of the tilt sensor 101 becomes smaller as compared with the light beam reflected by the mirror portion 102b. Therefore, in the case where the light spot 110a formed by the tilt sensor 101 partially exists in the mirror portion 102b, the amount of the light received by one of the pair of light receiving elements of the tilt sensor 101 becomes different from the amount of the light received by the other light receiving element, so that a differential signal output is generated. If the tilt compensation control is performed under such a state, then some failure is likely to occur in the recording and the reproduction because the optical pickup cannot direct the light beam perpendicular the optical pickup.

In order to avoid this failure, as disclosed in Japanese Utility Model Publication No. 3-13684, the tilt compensation control is suspended immediately before e part of the light spot 110a enters the mirror portion 102b and the state is maintained as a state where the normal tilt compensation control is performed, or an interpolation is performed based on the tilt compensation control data stored beforehand in the optical information recording and reproducing apparatus.

On the other hand, a high-density and large-capacity information recording and reproducing apparatus which performs recording and/or reproduction for a phase change type optical disk has recently been developed.

As a rewritable optical disk for recording, reproducing and erasing a signal thereon/therefrom, a phase change type optical disk using a chalcogel compound as a material of the recording thin film thereof is known. In general, when the recording thin film material is in a crystalline state, the state is regarded as an unrecorded state, and a signal is recorded on the recording thin film by irradiating the recording thin film with laser light to melt and cool the material so as to change the material into an amorphous state. On the other hand, in the case of erasing the recorded signal, the temperature of the recording thin film is increased by irradiating the thin film with a lower-output laser light than the light used in the recording, and the thin film material is changed into a crystalline state.

As the recording thin film material, a material which is mainly composed of Te, In, Sb, Se or the like and whose phase can reversely change between the amorphous state and the crystalline state, or a material in which the phase change is reversibly caused between two different kinds of crystalline structures is generally used. Such a phase change type recording operation has an advantage in that an information signal can be overwritten by using a single laser beam as a recording instrument. That is to say, by modulating the laser output between a recording level and an erasure level in accordance with the information signal and irradiating the track on which information has already been recorded with laser light again, a new signal can be recorded thereon while erasing the previous information signal. The above-described phase change type optical disk is disclosed, for example, in Japanese Laid-Open Patent Publication No. 56-145530.

For an optical information recording and reproducing apparatus for recording and reproducing information onto/from a phase change type optical disk, a phase change type optical disk having a capacity of about 500 MBytes and a diameter of 130 mm or less is used. The causes no problems even when the warp of the optical disk optical system of such an apparatus is designed so that the tilt angle formed between the optical disk and the optical axis of the recording/reproducing laser beam causes no problems even when the warp of the optical disk is about 0.3 mm, and the margins for recording and reproduction are secured. Therefore, such an apparatus does not include a function of compensating the tilt angle between the optical disk and the optical axis of the laser beam.

However, the above-described optical information recording and reproducing apparatus has the following problems.

First, in the case of using the tilt sensor having a configuration shown in FIG. 16, the zero-point offset adjustment varies the distance between the tilt sensor and the optical disk. Specifically, by fastening or loosening the adjusting screw 107, the distance L between the tilt sensor 101 and the optical disk 102 is varied in the range of $\Delta La$ to $\Delta Lb$. Such variation becomes one of the obstacles of reducing the thickness of an optical information recording and reproducing apparatus. In addition, if the gain of the tilt sensor is adjusted, then the sensitivity of the light receiving elements of the tilt sensor is adversely varied. Therefore, in view of this variation in the sensitivity, the gain adjustment width of the tilt compensation circuit (not shown) is required to be large.

Furthermore, in a large-sized optical disk having a diameter as large as 300 mm, e.g., a laser disk, the tilt compensation control can be performed in a sufficiently large region of the disk, whereas in a small-sized optical disk having a diameter of 130 mm or less, it can be performed only in an extremely small region of the disk. Moreover, in an optical disk with a large warp, the tilt angle gradually increases from the inner circumference to the outer circumference thereof. Accordingly, in the case where the tilt compensation control is not performed in the outer region of the disk as in the method disclosed in Japanese Utility Model Publication No. 3-13864, the tilt angle of an actual disk becomes different from the interpolated tilt angle of an optical pickup. The smaller the diameter of an optical disk is, the larger the influence of the difference becomes. Therefore, a failure is likely to occur in a small-sized optical disk having a diameter of 130 mm or less when the recording or the reproduction is performed. In addition, an optical disk reproducing apparatus cannot reproduce the information recorded in an optical disk unless the apparatus can read the directory stored in the read-in region of the optical disk, and such a case is regarded as a disk error.

On the other hand, in an optical information recording and reproducing apparatus for recording/reproducing onto/from a phase change type optical disk, a mechanism for detecting and compensating the tilt of the disk is not provided, as described above. However, if the recording capacity is increased by increasing the recording density, it is effective to perform a tilt compensation control even in a small-sized optical disk having a diameter of 130 mm or less. In a phase change type optical disk, the information is recorded and/or reproduced by utilizing the difference in the reflectance between the crystalline portion and the amorphous portion. However, this difference in reflectance adversely effects the detection of the tilt of the optical disk. That is to say, the amount of the light reflected by the optical disk is varied when the light spot formed by the tilt sensor passes the boundary between the crystalline portion and the amorphous portion. Therefore, if the tilt angle of the phase change type disk is attempted to be detected by the tilt sensor described above, the outputs of the pair of light receiving elements of the tilt sensor become different from each other even though the optical disk has no tilt. As a result, the tilt sensor outputs a differential signal in passing the boundary between the crystalline portion and the amorphous portion as if the optical disk had a tilt, and an error is consequently caused in the tilt compensation control.

SUMMARY OF THE INVENTION

According to one aspect of the present invention, an apparatus for optically performing recording of information and/or reproduction of information for an optical disk having a recording surface is provided, the apparatus includes: an optical pickup for forming a first light spot on the recording surface; transporting means for bidirectionally transporting the optical pickup in a radial direction of the optical disk; a tilt sensor, arranged to be transported with the optical pickup, for detecting a tilt angle of the recording surface of the optical disk with respect to an optical axis of the optical pickup, the tilt sensor including a light source for forming a second light spat and at least a pair of light receiving elements; and tilt compensating means for angularly adjusting the optical pickup based on the detected tilt angle so as to make the optical axis of the optical pickup perpendicular to the recording surface of the optical disk. In this apparatus, the recording surface includes a recording region having pits or grooves and mirror regions having no pits or no grooves, the mirror regions being located to the inside and the outside of the recording region, the recording region being divided into a first region necessarily accessed by the optical pickup and a second region provided on the outside of the first region, and the second light spot is formed so that an imaginary line connecting the first light spot with the second light spot is at a predetermined angle with respect to a direction perpendicular to the radial direction of the optical disk, the predetermined angle being larger than approximately 0 degrees whereby the entire second light spot exists in the first region when the first light spot is located on an innermost track of the first region and exists in the recording region when the first light spot is located on an outermost track of the first region.

According to another aspect of the present invention, an apparatus for optically performing recording of information and/or reproduction of information for an optical disk having a recording surface is provided, on the recording surface being provided a recording region having pits or grooves and mirror regions which do not have pits or grooves. The apparatus includes: an optical pickup for forming a first light spot on the recording surface; transporting means for bidirectionally transporting the optical pickup in a radial direction of the optical disk; a tilt sensor, arranged to be transported with the optical pickup, for detecting a tilt angle of the recording surface of the optical disk with respect to an optical axis of the optical pickup, the tilt sensor including a light source for forming a second light spot and at least a pair of light receiving elements; tilt compensating means for angularly adjusting the optical pickup based on the detected tilt angle so as to make the optical axis of the optical pickup perpendicular to the recording surface of the optical disk; position detecting means for operating when the first light spot is located on the inside of an initial tilt setting position, the initial tilt setting position being such a position that the entire second spot exists in the recording region when the first light spot is located on the position; and initial-tilt maintaining means for stopping the tilt compensating means from performing the angularly adjustment of the optical pickup and for keeping the adjustment of the optical pickup when the position detecting means operates.

In one embodiment, the initial-tilt maintaining means keeps the optical pickup being adjusted when the first light spot is located on the initially tilt setting position.

In another embodiment, the initial-tilt maintaining means keeps the optical pickup as it is adjusted so that the optical axis of the optical pickup is perpendicular to a recording surface of a warp-free optical disk.

According to still another aspect of the present invention, an optical disk is provided. The optical disk includes: a recording region in which information is recorded in a form of a pit or a groove, the information being recorded on and/or reproduced from the recording region by irradiating a light beam; and a tilt detecting region which is provided on the inside of the recording region and has pits or grooves. In the optical disk, the information is recorded on and/or reproduced from the recording region, while a tilt compensation servo control is performed using a tilt sensor to make the light beam be irradiated substantially perpendicular to the optical disk, the tilt sensor detecting a tilt angle of the optical disk with respect to the light beam.

In one embodiment, the optical disk further includes an additional tilt detecting region which is provided on the outside of the recording region and has pits or grooves.

According to still another aspect of the present invention, an apparatus for optically performing recording of information and/or reproduction of information for the optical disk is provided. The apparatus includes: an optical pickup for forming a first light spot on the recording surface; transporting means for bidirectionally transporting the optical pickup in a radial direction of the optical disk; a tilt sensor, arranged to be transported with the optical pickup, for detecting a tilt angle of the recording surface of the optical disk with respect to an optical axis of the optical pickup, the tilt sensor including a light source for forming a second light spot and at least a pair of light receiving elements; and tilt compensating means for angularly adjusting the optical pickup based on the detected tilt angle so as to make the optical axis of the optical pickup perpendicular to the recording surface of the optical disk. In this apparatus, the recording surface includes a recording region having pits or grooves and mirror regions having no pits or no grooves, the mirror regions being located on the inside and the outside of the recording region, the recording region being divided into a first region necessarily accessed by the optical pickup and a second region provided on the outside of the first region, and the second light spot is formed so that an imaginary line connecting the first light spot with the second light spot is at a predetermined angle with respect to a direction perpendicular to the radial direction of the optical disk, the predetermined angle being larger than approximately 0 degree, whereby the entire second light spot exists within at least one of the first region and the tilt detecting region when the first light spot is located on an innermost track of the first region.

In one embodiment, the entire second light spot exists in the recording region when the first light spot is located on an outermost track of the first region.

In another embodiment, the optical disk further includes an additional tilt detecting region which has pits or grooves and is provided on the outside of the recording region to be positioned between one of the mirror regions and the recording region, and the entire second light spot exists within at least one of the additional tilt detecting region and the recording region when the first light spot is located on an outermost track of the first region.

According to still another aspect of the present invention, a tilt compensation method for compensating e tilt of an optical disk with respect to an optical axis of an optical pickup in an apparatus for performing recording of information and/or reproduction of information for the optical disk using the optical pickup is provided, the optical disk including a recording region having pits or grooves. The method includes: a step of performing a tilt compensation servo control in which the tilt of the optical disk is detected and the optical pickup is then adjusted to substantially eliminate the tilt of the optical disk; a step of performing an initial tilt compensation control to keep the optical pickup adjusted at a predetermined state, while stopping the tilt compensation servo control; a step of controlling the apparatus to perform the initial tilt compensation control when the optical pickup forms a light spot on the inside of an initial tilt setting position in the recording region and to perform the tilt compensation servo control when the light spot is formed on the outside of the initial tilt setting position.

In one embodiment, the tilt compensation method further includes an initial tilt setting step of detecting the tilt of the optical disk when the light spot is located at the initially tilt setting position and then angularly adjusting the optical pickup to substantially eliminate the tilt of the optical disk. In this method, the initial tilt compensation control keeps the optical pickup adjusted in the initial tilt setting step.

In another embodiment, the initial tilt compensation control keeps the optical pickup adjusted when an optical axis of the optical pickup is perpendicular to a warp-free optical disk.

In still another embodiment, the tilt of the optical disk is detected by a tilt sensor including a light source for forming an additional light spot, and the initially tilt setting position is such a position that the entire additional light spot exists within the recording region when the light spot formed by the optical pickup is located on the position.

In still another embodiment, the initial tilt setting step is performed prior to a starting of the recording of information or the reproduction of information.

According to still another aspect of the present invention, a tilt sensor for irradiating an optical disk with a light beam and detecting a tilt of the optical disk with respect to an optical pickup based on the light beam reflected from the optical disk is provided. The tilt sensor includes: a light source for emitting divergent light; at least a pair of light receiving elements for receiving the reflected light beam and outputting signals used for obtaining a signal indicative of the tilt of the optical disk in accordance with the light amount of the received light beam, the light receiving elements being arranged in a predetermined direction; collimating means for converting the divergent light by transmitting the divergent light to a substantially collimated light and for directing the substantially collimated light to the optical disk as the light beam; and diaphragm means for limiting the width of the light beam in the predetermined direction.

According to still another aspect of the present invention, a tilt sensor for irradiating an optical disk with a light beam and detecting a tilt of the optical disk with respect to an optical pickup based on the light beam reflected from the optical disk is provided, the optical disk being of a phase change type having crystallized portions and amorphous portions. The tilt sensor includes: a light source for emitting divergent light; at least a pair of light receiving elements for receiving the reflected light beam and outputting signals used for obtaining a signal indicative of the tilt of the optical disk in accordance with the light amount of the received light beam, the light receiving elements being arranged in a predetermined direction; and collimating means for converting the divergent light by transmitting the divergent light to a substantially collimated light and for directing the substantially collimated light to the optical disk as the light beam. In the tilt sensor, the light source emits the divergent light having a wavelength in a predetermined range, and, for light having the wavelength in the predetermined range, a reflectance at the crystallized portions being substantially equal to that at the amorphous portions for the light having the wavelength.

In one embodiment, the tilt sensor further includes diaphragm means for limiting the width of the light beam in the predetermined direction.

In another embodiment, the diaphragm means includes a slit plate having an opening provided in the vicinity of a region of the collimating means where the light beam exits.

In still another embodiment, the tilt sensor further includes a lens provided on an optical path of the divergent light emitted from the light source, the lens including a light transmitting portion for allowing a part of the divergent light to pass therethrough and a light interrupting portion for interrupting the remaining part of the divergent light. In the tilt sensor, the light transmitting portion serves as the collimating means and the light interrupting portion serves as the diaphragm means.

In one embodiment, the apparatus further includes the tilt sensor.

According to still another aspect of the present invention, an apparatus for optically performing recording of information and/or reproduction of information for an optical disk by using an optical pickup is provided. The apparatus includes: a tilt sensor including: a light source for emitting a light beam; at least a pair of light receiving elements for receiving the light beam reflected from the optical disk, the light receiving elements being arranged in a predetermined direction; and a lens for collimating the light beam, the tilt sensor detecting a tilt of the optical disk based on the reflected light beam; a first base on which the tilt sensor is mounted; a second base on which the first base is rotatably mounted; and installing means for adjusting an angle of the first base with respect to the second base by rotating the first base, and thereafter installing the first base on the second base.

In one embodiment, the installing means installs the first base on the second base so as to allow the tilt sensor to be rotated around a point in a plane of the optical disk which reflects the light beam, the point being located above the tilt sensor.

In another embodiment, the first base includes a curvature portion having a predetermined curvature from the point, and the installing means installs the first base on the second base with the curvature portion in contact with the second base.

In still another embodiment, a part of the optical pickup serves as the second base.

In an optical information recording and reproducing apparatus having the above-described configuration according to the present invention, it is possible to substantially eliminate the error caused in detecting the tilt on the innermost circumference and the outermost circumference of the recording surface in a conventional small-sized optical disk having a diameter of 130 mm or less. As a result, information can be more satisfactorily recorded onto and/or reproduced from an optical disk having a higher density as compared with a conventional one. In addition, by providing a tilt detection region in the peripheral portion of the recording surface of an optical disk or by limiting the aperture of the tilt sensor for the light beam, a tilt compensation range can be widened and a tilt compensation control can be performed more stably. Moreover, by appropriately adjusting the emission wavelength of the tilt sensor, a tilt compensation control can be surely performed with respect to a phase change type optical disk, thereby realizing higher-density recording and reproduction operations as compared with a conventional apparatus. Furthermore, by performing a zero-point offset adjustment while rotating the tilt sensor with respect to a point of the recording surface of the optical disk at which the light beam forms the light spot, it is possible to eliminate the variation in the sensitivity caused by the zero-point offset adjustment and reduce the thickness of the apparatus.

Thus, the invention described herein makes possible the advantages of (1) providing an optical information recording and reproducing apparatus including a tilt sensor allowing for a high-precision tilt compensation control in a wider range which is suitably applicable to an optical disk for recording and reproduction such as a small-sized optical disk having a diameter of 130 mm or less and a phase change type optical disk, in particular, and (2) providing a tilt sensor, a tilt compensation method and a disk having a structure suitable for the tilt compensation which are used for accomplishing such a purpose.

These and other advantages of the present invention will become apparent to those skilled in the art upon reading and understanding the following detailed description with reference to the accompanying figures.

BRIEF DESCRIPTION OF THE DRAWINGS

FIG. 4A is an enlarged plan view of the tilt sensor of the first example, while

FIG. 10A is a cross-sectional view showing a configuration for a tilt sensor according to a fifth example of the present invention, while FIG. 10B is a plan view thereof.

FIG. 11 is a plan view showing the positional relationship between the light spots formed by the tilt sensor and the optical pickup on the optical disk in the fifth example.

FIG. 12a is a plan view showings configuration for a tilt sensor according to a modified example of the fifth example of the present invention, while

FIG. 13A is a plan view showings configuration for a tilt sensor according to another modified example of the fifth example of the present invention, while

DESCRIPTION OF THE PREFERRED EMBODIMENTS

Hereinafter, the present invention will be described by way of illustrative examples with reference to accompanying drawings.

EXAMPLE 1

Figure 1:
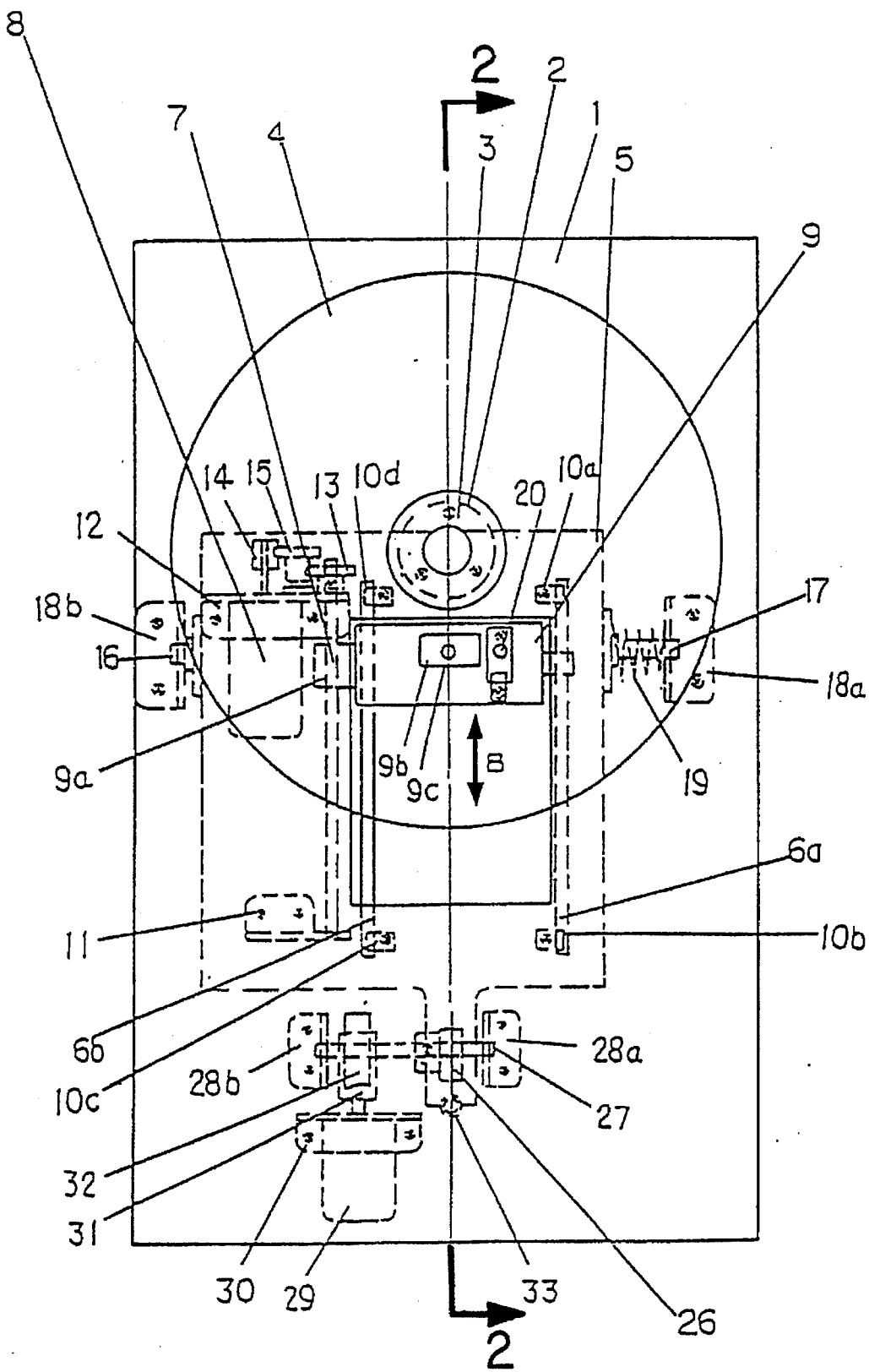
FIG. 1 is a plan view of an optical information recording and reproducing apparatus according to a first example of the present invention.
Figure 2:
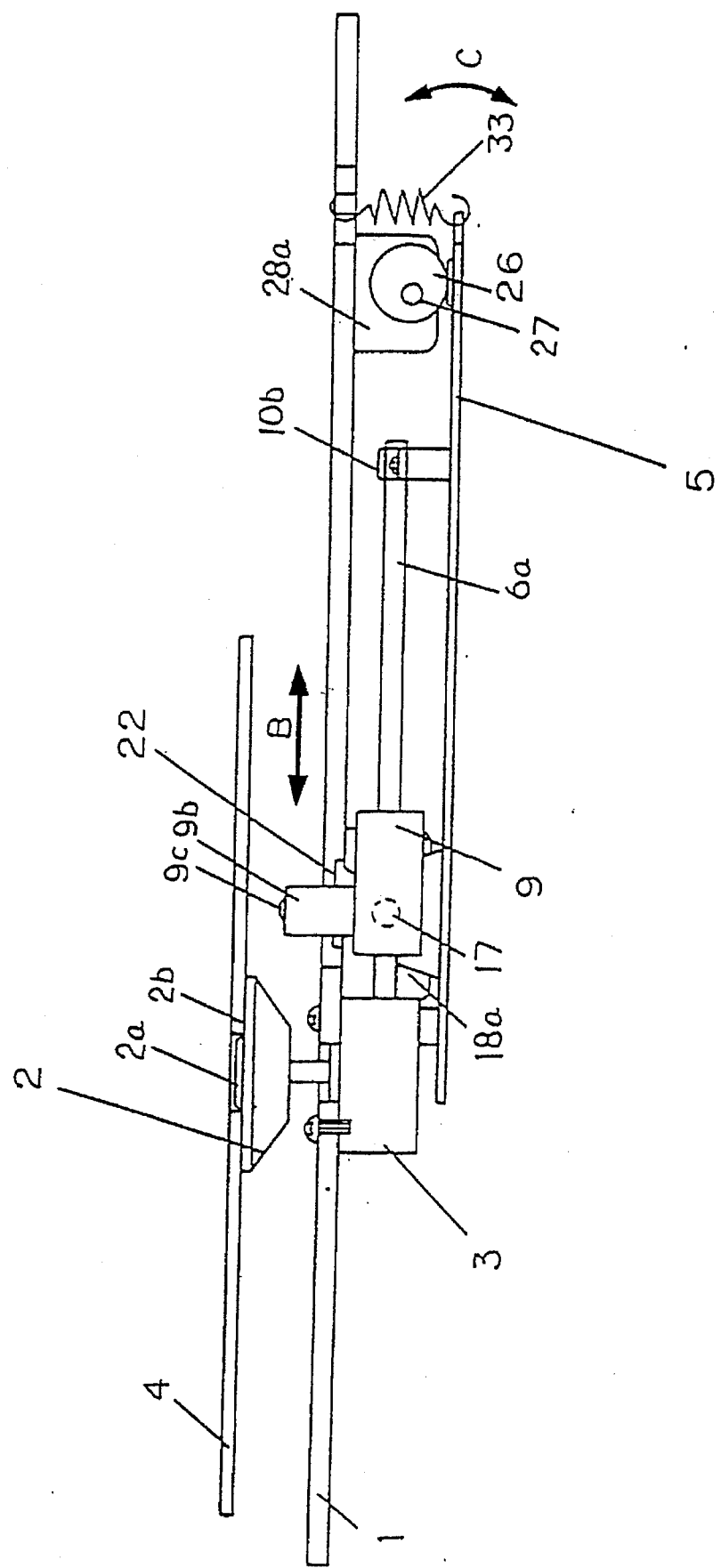
FIG. 2 is a cross-sectional view of the optical information recording and reproducing apparatus of the first example taken along the line 2—2 in FIG. 1.

FIG. 1 is a plan view of an optical information recording and reproducing apparatus according to the present invention, while FIG. 2 is a cross-sectional view of the optical information recording and reproducing apparatus taken along the one-dot chain line 2—2 shown in FIG. 1.

As shown in FIGS. 1 and 2, a turn table 2 includes a convex portion 2a for shifting a shutter (not shown) of an optical disk 4 to prepare for recording or reproducing, and a mounting plane 2b for mounting the optical disk 4 thereon, and is fitted into a shaft of a disk driving motor 3 installed to a drive substrate 1. The turn table 2 rotates integrally with the disk driving motor 3 with the optical disk 4 mounted thereon.

Guide axes 6a and 6b are fixed to an auxiliary substrate 5 via axis fixing members 10a, 10b, 10c and 10d, thereby retaining an optical pickup 9 so that the optical pickup 9 can slide along the guide axes 6a and 6b. A transport lead screw axis 7 is rotatably supported by clamping members 11 and 12, and is attached over the auxiliary substrate 5. The transport lead screw axis 7 is engaged with an engagement portion 9a of the optical pickup 9 and has a gear 13 in one end portion thereof. A transport motor 8 is attached at the clamping member 12. The transport motor 8 rotates the transport lead screw axis 7 in the forward and backward directions by a rotational force, which is generated by the motor 8 and is transmitted to the gear 13 via gears 14 and 15, so that the motor 8 bidirectionally transports the optical pickup 9 in the radial direction B or the optical disk 4. As described above, the optical pickup 9 and the transport mechanism for transporting the optical pickup 9 are mounted on the auxiliary substrate 5.

The auxiliary substrate 5 has supporting axes 16 and 17 on both sides thereof in the direction vertical to the moving direction B of the optical pickup 9. The supporting axes 16 and 17 are attached to the drive substrate 1 via the members 18b and 18a, respectively, so as to pivotally move around the attached portions thereof in the direction indicated by the arrow C in FIG. 2. The auxiliary substrate 5 is energized toward the drive substrate 1 via an extension spring 19.

An objective lens 9c is provided for an actuator portion 9b of the optical pickup 9. The objective lens 9c is attached by support members (not shown), e.g., four wires, so as to translate in a focusing direction vertical to the recording surface of the optical disk 4 and in a tracking direction parallel to the radial direction B of the optical disk 4, respectively. The optical pickup 9 includes: a light source such as a laser for generating a light beam to be irradiated onto the optical disk 4 for recording and/or reproducing information an optical system for guiding the light beam from the light source to the recording surface of the optical disk 4 through the objective lens 9c and guiding the light reflected by the optical disk 4 to light receiving elements; and the light receiving elements (all of these members are not shown).

Figure 3:
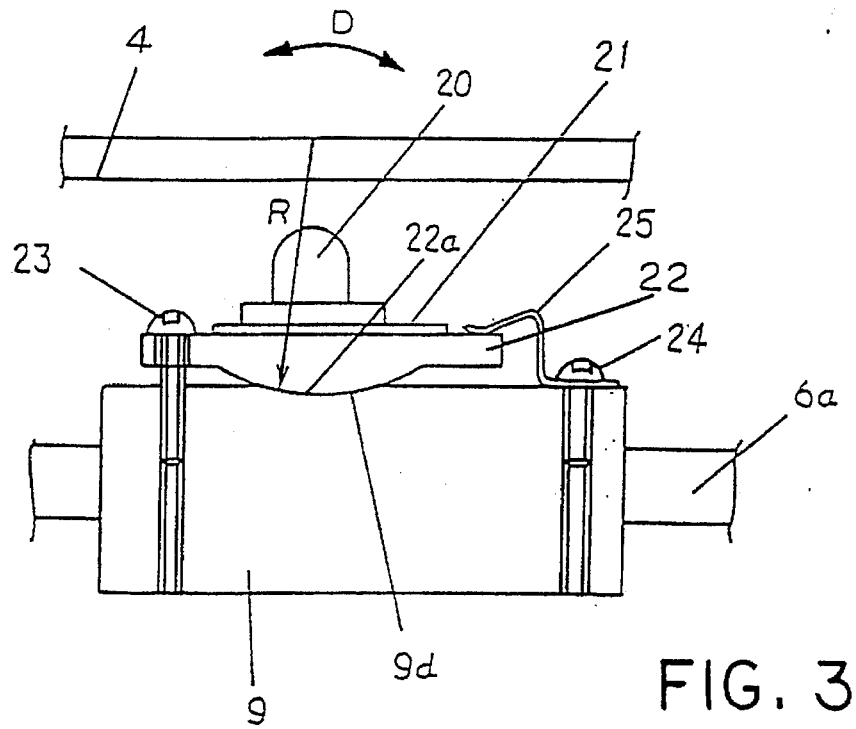
FIG. 3 is an enlarged side view showing a tilt sensor and the surrounding portions thereof in the optical information recording and reproducing apparatus of the first example.
Figure 4A:
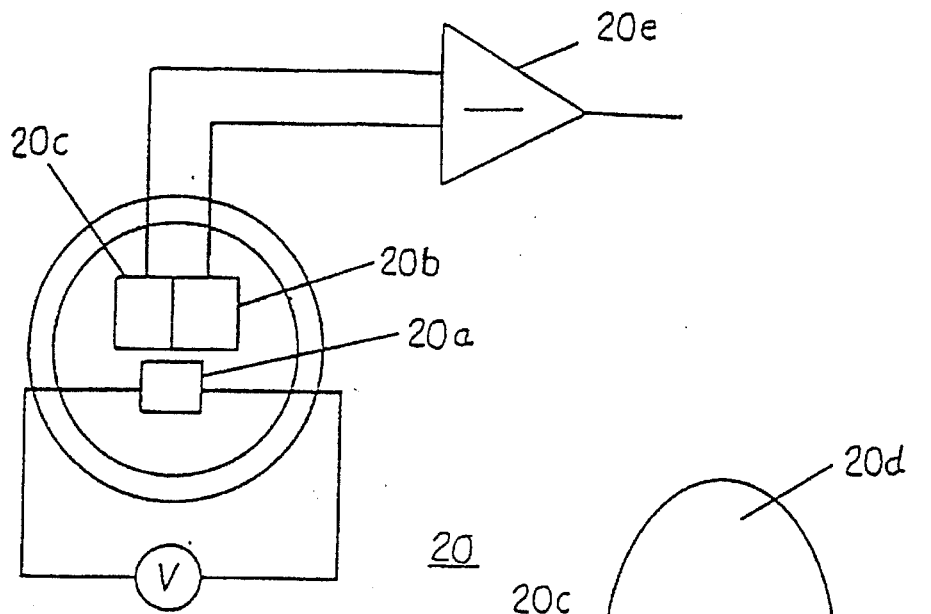
Figure 4B:
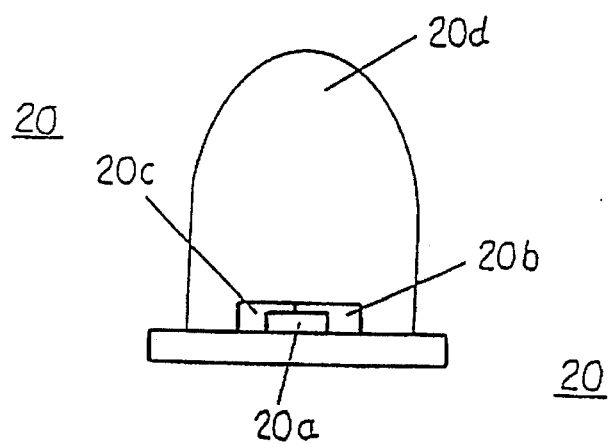
FIG. 4B is an enlarged side view thereof.

A tilt sensor 20 is further provided for the optical pickup 9. FIG. 3 is an enlarged side view showing the tilt sensor 20 and the surrounding portions, while FIGS. 4A and 4B are enlarged view showing the tilt sensor 20 alone: FIG. 4a is an enlarged plan view thereof; and FIG. 4B is an enlarged side view thereof.

The tilt sensor 20 includes: a light-emitting diode 20a functioning as a light source; a pair of photodiodes 20b and 20c which function as a pair of light receiving elements and are disposed along the radial direction of the optical disk 4; and an aspheric lens 20d including a surface having a curvature for converting the light emitted from the light source into substantially collimated light fluxes and irradiating the light fluxes onto the recording surface of the optical disk 4. All of these components are integrally formed so as to form the tilt sensor 20. When the light reflected by the optical disk 4 is incident onto the light receiving elements 20b and 20c, the outputs of the light receiving elements 20b and 20c are supplied to a differential amplifier 20e shown in FIG. 4A, where the difference between the output of the light receiving element 20b and that of the light receiving element 20c is obtained. The output of the differential amplifier 20e is supplied to a tilt compensation servo circuit (not shown), so that the tilt of the optical disk 4 is detected based on the output of the differential amplifier 20e therein.

The tilt sensor 20 is attached to a flexible lead substrate 21 with an adhesive and solder, and the flexible lead substrate 21 adheres to the upper surface of a sensor base 22. In this way, the tilt sensor 20 integrally installed on the sensor base 22. A curvature surface portion 22a having a radius R from a point of the recording surface of the optical disk 4 at which the light spot is formed by the tilt sensor 20 is provided on the bottom of the sensor base 22. The sensor base 22 installed on the optical pickup 9 by screws 23 and 24 and a leaf spring 25 so that the curvature surface portion 22a is in contact with a tilt sensor mounting portion 9d of the upper surface of the optical pickup 9. Therefore, in this example, the optical pickup 9 functions as a base on which the tilt sensor is mounted. Alternatively, a base for mounting the tilt sensor thereon can be provided separately from the optical pickup 9. However, if the tilt sensor 20 is mounted on the optical pickup 9 as is done in this example, the configuration of the installing section of the tilt sensor 20 can be simplified, and the tilt sensor 20 can always be transported together with the optical pickup 9 without changing the positional relationship between the tilt sensor 20 and the optical pickup 9.

In installing the tilt sensor 20 on the tilt sensor mounting portion 9d, the tilt sensor 20 can be angularly adjusted with respect to the optical disk 4 in the direction indicated by the arrow D in FIG. 3 by rotating the screw 23. Since the tilt sensor 20 has a production error, the differential output of the tilt sensor 20 does not become zero even if the disk has no warp. Therefore, in installing the tilt sensor 20 on the tilt sensor mounting portion 9d, the tilt sensor 20 is required to be angularly adjusted so that the differential output of the tilt sensor 20 becomes zero. This adjustment corresponds to the zero-paint offset adjustment. The amount of the tilt of the tilt sensor is indicated as one of the requirements for making full use of the performance thereof. In order to detect the tilt of the disk with high precision, the above-described zero-point offset adjustment and an arrangement for realizing this adjustment are necessary.

Figure 16:
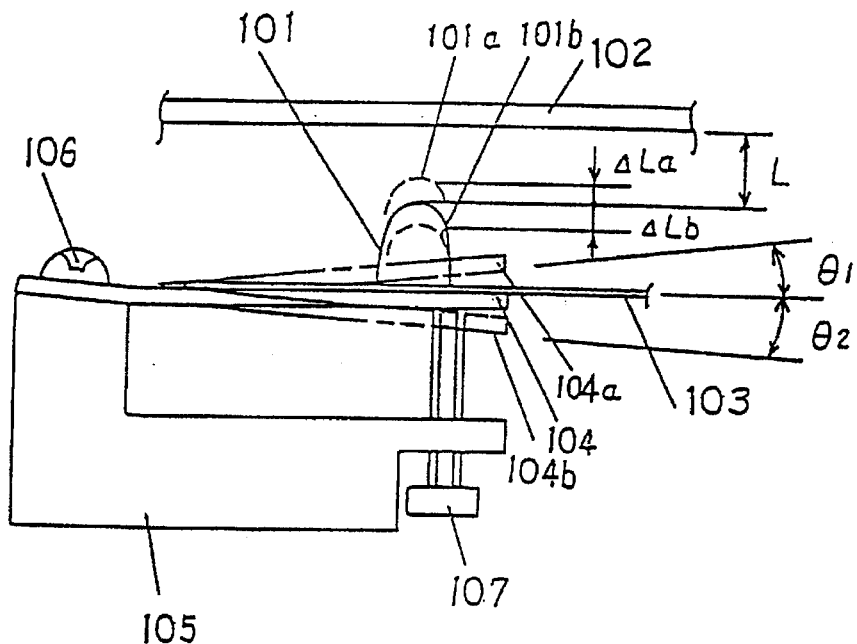
FIG. 16 is an enlarged side view showing a tilt sensor and the surrounding portions thereof in a conventional optical information recording and reproducing apparatus.
Figure 17:
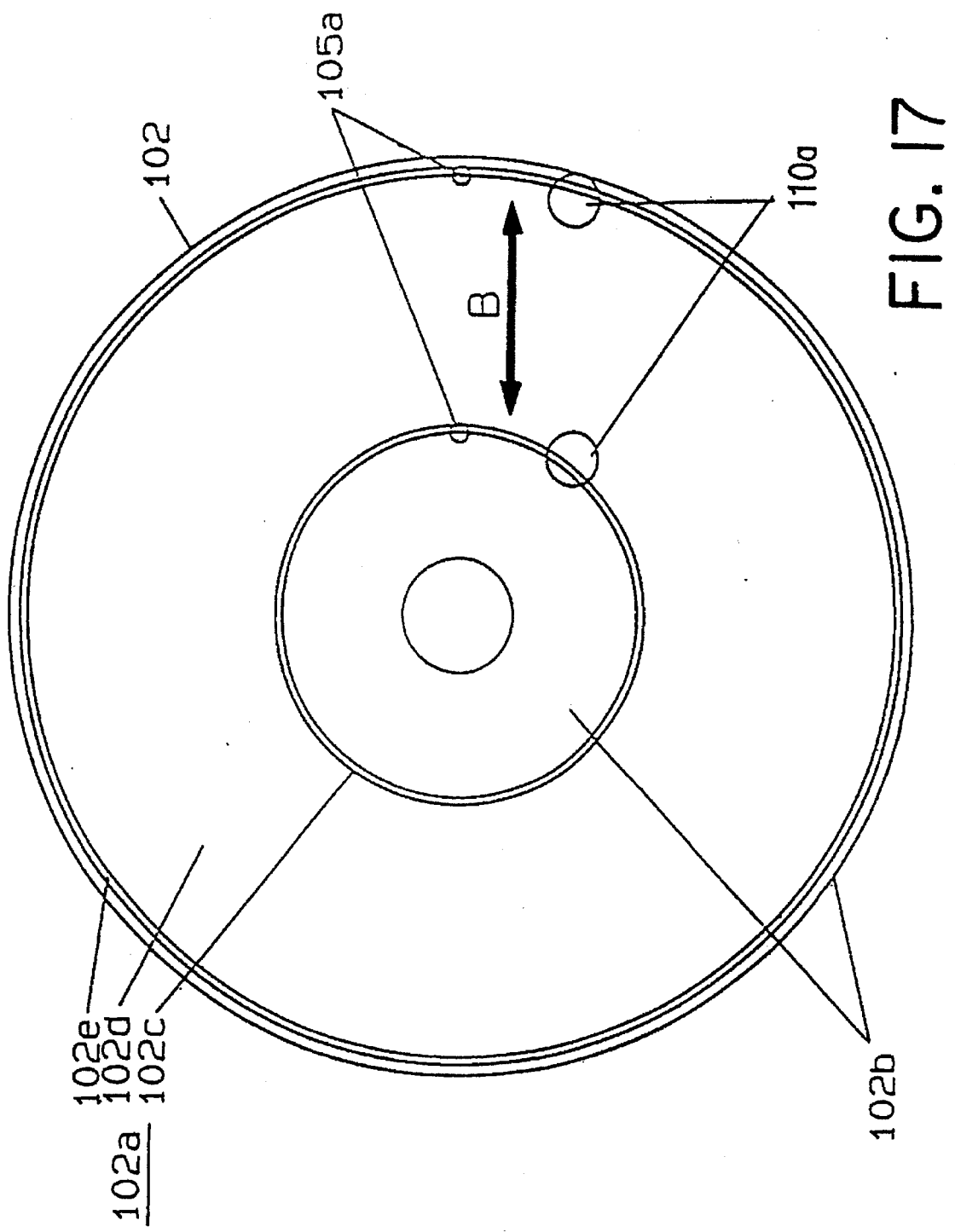
FIG. 17 is a plan view showing the positional relationship between the light spots formed by the tilt sensor and the optical pickup on the optical disk in a conventional optical information recording and reproducing apparatus.

In general, the sensitivity of a light receiving element such as a photodiode is varied in accordance with the distance between the element and a source emitting the light to be received by the element. In the case of using such a light receiving element in the tilt sensor, the variation in the distance between the optical disk and the tilt sensor causes not only a variation in the distance between the optical disk and the light receiving element, but also a variation in the distance between the light source and the optical disk. Therefore, the variation in the distance between the optical disk and the tilt sensor considerably affects the sensitivity of the light-receiving element of the tilt sensor. Accordingly, in a conventional configuration shown in FIG. 16 where the tilt sensor is attached to one and of the metal leaf spring, the other end of the metal leaf spring is fixed, and the angle between the tilt sensor and the optical disk by deforming the metal leaf spring, it is necessary to take into consideration the variation in the distance between the tilt sensor and the optical disk in a circuit section for detecting the amount of the tilt to which the output of the sensor is to be supplied.

On the other hand, in this example, the zero-point offset adjustment can be performed only by varying the angle of the tilt sensor 20 with respect to the optical disk 4 without moving the position of the tilt sensor 20. Therefore, it is no longer necessary to take into consideration the variation in the sensitivity of the light receiving element of the tilt sensor. As a result, it is also unnecessary set the gain adjustment width of the tilt compensation servo control circuit unlike a conventional tilt sensor. In addition, since the distance between the tilt sensor and the optical disk does not change, the thickness of the entire optical information recording and reproducing apparatus can be reduced.

A tilt compensating cam 26 fixed to an axis 27 at one end is rotatably attached to the drive substrate 1 via members 28a and 28b, as shown in FIG. 1. The cam 26 and the axis 27 integrally rotors. A tilt motor 29 is further installed to the drive substrate 1 via a clamping member 30, and drives the cam 26, via a worm 31 and a worm wheel 32, to rotate in the forward direction and the backward direction. As shown in FIG. 2, the auxiliary substrate 5 is energized toward the drive substrate 1 by an extension spring 33 and is in contact with the outer circumference of the cam 26.

Next, referring to FIG. 5, the positional relationship between a light spot formed by the optical pickup 9 and a light spot formed by the tilt sensor 20 will be described.

Figure 5:
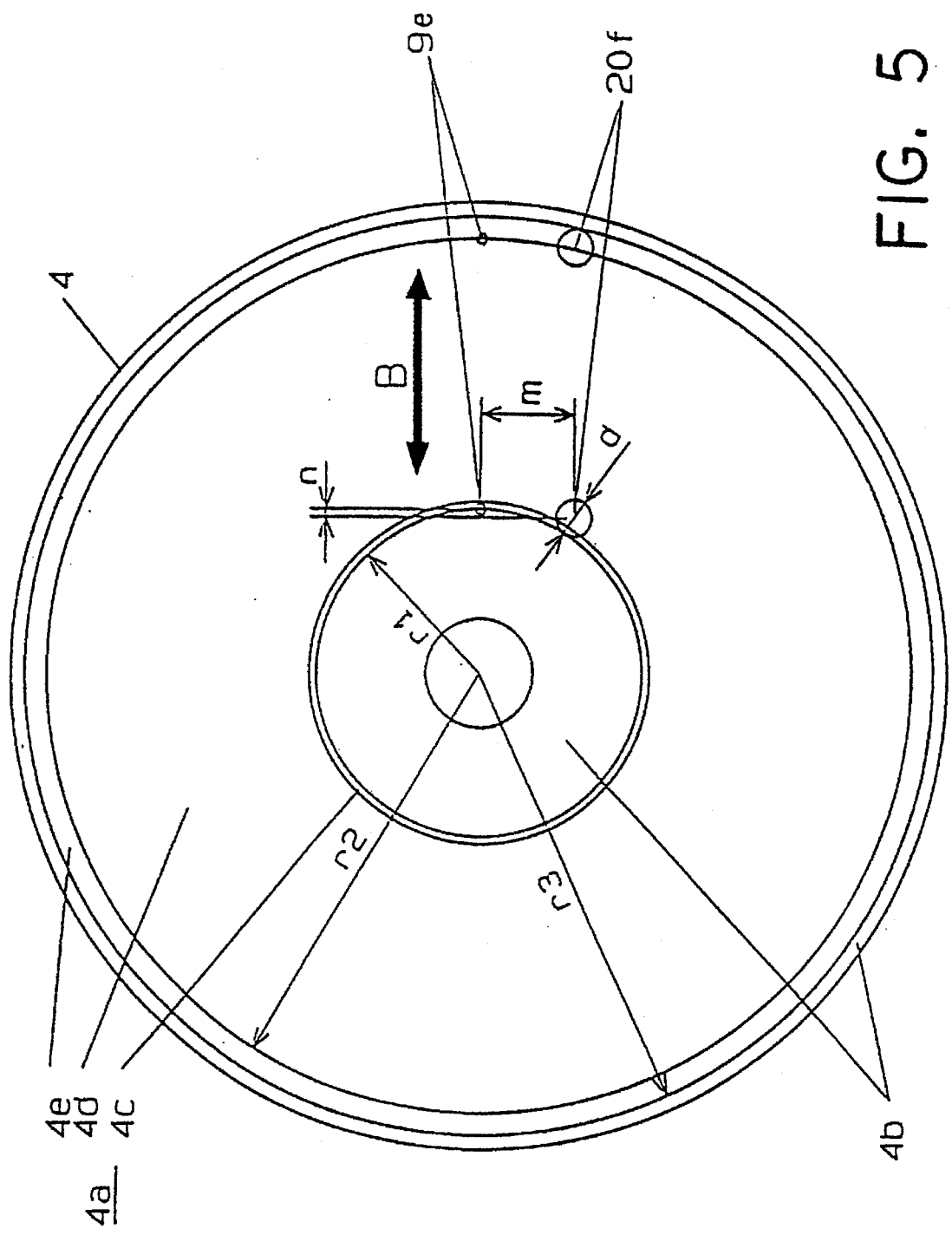
FIG. 5 is a plan view showing the positional relationship between the light spots formed by the tilt sensor and the optical pickup on the optical disk in the first example.

FIG. 5 shows the positions onto which the light beam is irradiated by the tilt sensor 20 when the light beam emitted from the optical pickup 9 is irradiated onto a position on the innermost track and a position on the outermost track of the optical disk 4. The optical disk 4 includes: an information recording region 4a on which pits or grooves are formed; and mirror portions 4b formed on the inner side and the outer side thereof. The information recording region 4a consists of a read-in region 4c and a program region 4d which the optical pickup 9 must access, and a read-out region 4e which the optical pickup 9 need not access. The innermost circumference of the read-in region 4c has a radius r1; the outermost circumference of the program region 4d has a radius r2; and the outermost circumference of the readout region 4e has a radius r3.

The light beam emitted from the tilt sensor 20 has a circular cross section, and forms a light spot 20f having a diameter d on the optical disk 4. The center of the light spot 20f is distant from the center of the light spot 9e formed by the optical pickup 9 on the optical disk 4 by a distance m in the direction vertical to the radial direction B of the optical disk 4 and by a distance n in the direction B. These distances m and n are determined so that the entire light spot 20f formed by the tilt sensor 20 is located within the information recording region 4a when the light spot 9e formed by the optical pickup 9 is located on the innermost track of the information recording region 4a and that the entire light spot 20f is located within the information recording region 4a when the light spot 9e is located on the outermost track of the program region 4d which the optical pickup 9 must access. That is, a line which imaginary connects the light spots 9e and 20f is at a predetermined angle with respect to the radial direction of the optical disk B. This predetermined angle does not include 0 degree.

An operation for setting the distances m and n will be described in more detail. When the center of the light spot 9e of the optical pickup 9 is located on the innermost track of the information recording region 4a, i.e., on the inner circumference of the read-in region 4c, the center of the light spot 20f of the tilt sensor 20 is located at a position satisfying the following relationship:

$$\{m^2 + (r1-n)^2\}^{1/2} > r1 + d/2 \quad (1)$$

On the other hand, when the center of the light spot 9e of the optical pickup 9 is located on the outermost circumference of the program region 4d of the optical disk 4, the center of the light spot 20f of the tilt sensor 20 is located at a position satisfying the following relationship:

$$\{m^2 + (r2-n)^2\}^{1/2} > r2 + d/2 \quad (2)$$

As described above, in this example, when the light spot formed by the optical pickup 9 is located within the read-in region 4c and the program region 4d, the light beam emitted from the tilt sensor 20 is always irradiated to a position within the information recording region 4a.

In order to satisfy the relationships expresses by the inequalities (1) and (2), the respective regions and distances in the optical disk 4 are set as follows: the inner circumference (i.e., the innermost track) of the read-in region 4c has the radius r1 of 22.5 mm; the outer circumference of the program region 4d has the radius r2 of 60 mm; the outer circumference of the read-out region 4e has the radius r3 of 63 mm; the diameter d of the light spot 20f formed by the tilt sensor 20 is set to be 5 mm; and the light spot 20f is distant from the light spot 9e formed by the optical pickup 9 by the distance m of 13 mm in the direction vertical to the radial direction B of the optical disk 4 and by the distance n of 1.1 mm in the direction B. It is noted that these value are merely an exemplary set of values satisfying the above inequalities (1) and (2), and that the positions of the respective regions and the positional relationship between the tilt sensor and the optical pickup in the optical disk are not limited to those described above.

Next, the operation of the optical information recording and reproducing apparatus having the above-described configuration will be briefly described.

When the optical disk 4 is mounted on the turn table 2, the disk driving motor 3 starts to rotate, and at the same time, the optical pickup 9 is transported in the direction B toward the vicinity of the innermost track of the information recording region 4a of the optical disk 4 by the transport mechanism consisting of the transport motor 8, the gears 13, 14 and 15, and the transport lead screw axis 7. Then, the tilt sensor 20 detects the tilt of the optical disk 4 with respect to the optical axis of the optical pickup 9 based on the light reflected by the optical disk 4. The output of the tilt sensor 20 is converted into a differential output by the differential amplifier 20e, and then supplied to a tilt compensation servo circuit (not shown), thereby driving the tilt motor 29. When the tilt motor 29 is driven, the cam 26 starts to pivotally move, so that the auxiliary substrate 5 on which the optical pickup 9 is mounted starts to rotate in the direction indicated by the arrow C in FIG. 2 around the supporting axes 16 and 17. A so-called tilt compensation for adjusting the optical axis of the optical pickup 9 to be vertical to the optical disk 4 is performed in this way.

After the tilt compensation has been performed in the vicinity of the innermost track of the information recording region 4 in such a manner, the optical pickup 9 starts to record information onto the optical disk 4 or reproduce information from the optical disk 4. The optical pickup 9 is carried from the inner circumference to the outer circumference of the optical disk 4, i.e., the innermost track to the outermost track, thereby sequentially recording/reproducing information onto/from the optical disk 4. During these recording and reproducing operations, the tilt sensor 20 goes on detecting the tilt of the recording surface of the optical disk 4 and the cam 26 continues to be driven based on the detection results. Therefore, the real-time tilt compensation can be continuously performed during the recording and reproducing operations.

In the optical information recording and reproducing apparatus of the present example, as long as the light spot 9e formed by the optical pickup 9 is located within the region onto/from which information can be recorded and/or reproduced, the light beam emitted from the tilt sensor 20 is always located within the information recording region 4a of the optical disk 4, and does not enter the mirror portions 4b unlike conventional apparatuses. Consequently, the tilt sensor 20 can accurately detect a tilt (the inclination of the optical disk with respect to the optical axis of the optical pickup) in the vicinity of the innermost and the outermost peripheries of the optical disk 4, so that a tilt compensation control can be performed stably.

In this example, the tilt compensation is performed by pivotally moving the auxiliary substrate 5 with the optical pickup 9 and the transport mechanism for the optical pickup 9 integrated thereon. However, even if only the optical pickup 9 is pivotally moved, the same effects as those described above can be attained because the tilt sensor 20 is integrally mounted on the optical pickup 9.

EXAMPLE 2

Next, an optical information recording and reproducing apparatus according to a second example of the present invention will be described.

Figure 6:
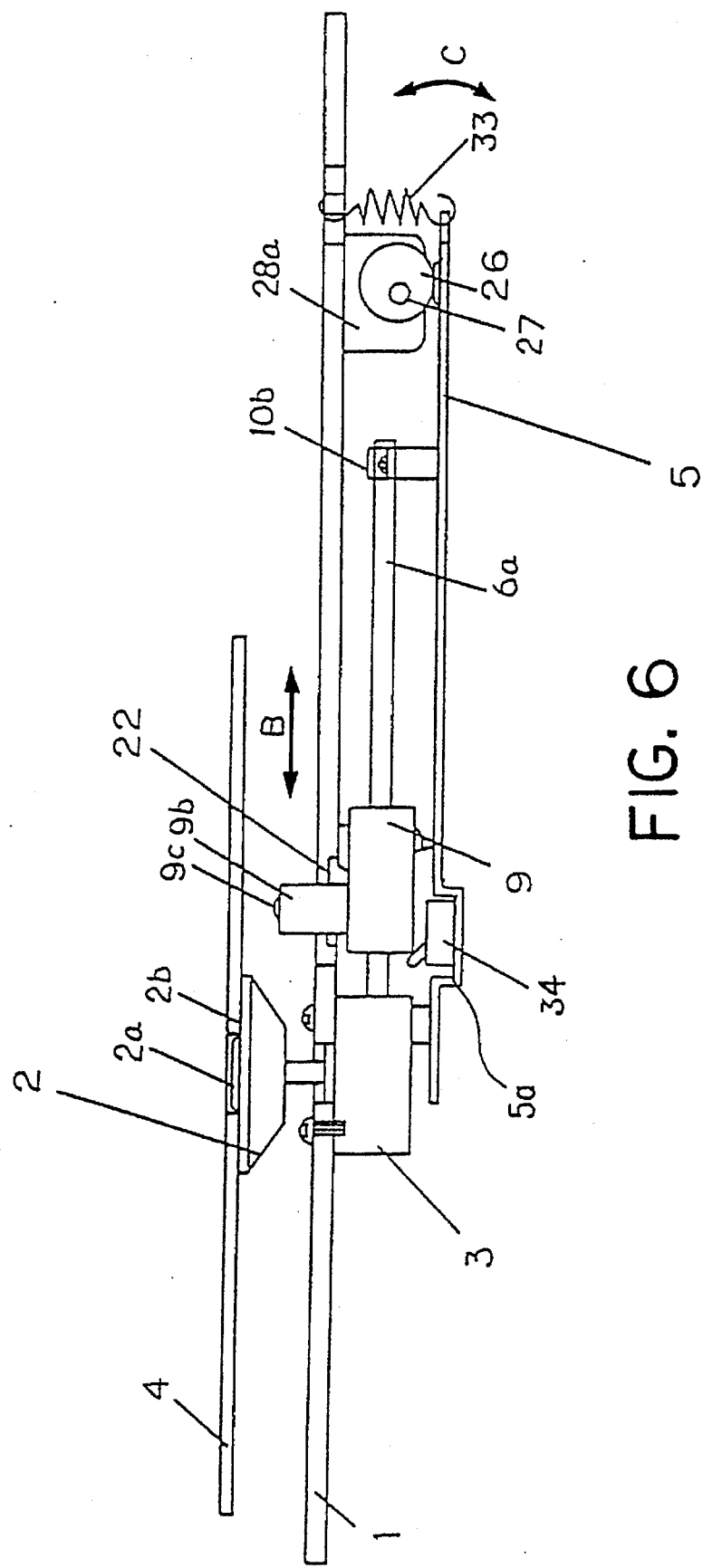
FIG. 6 is a cross-sectional view showing a configuration for an optical information recording and reproducing apparatus according to a second example of the present invention.
Figure 7:
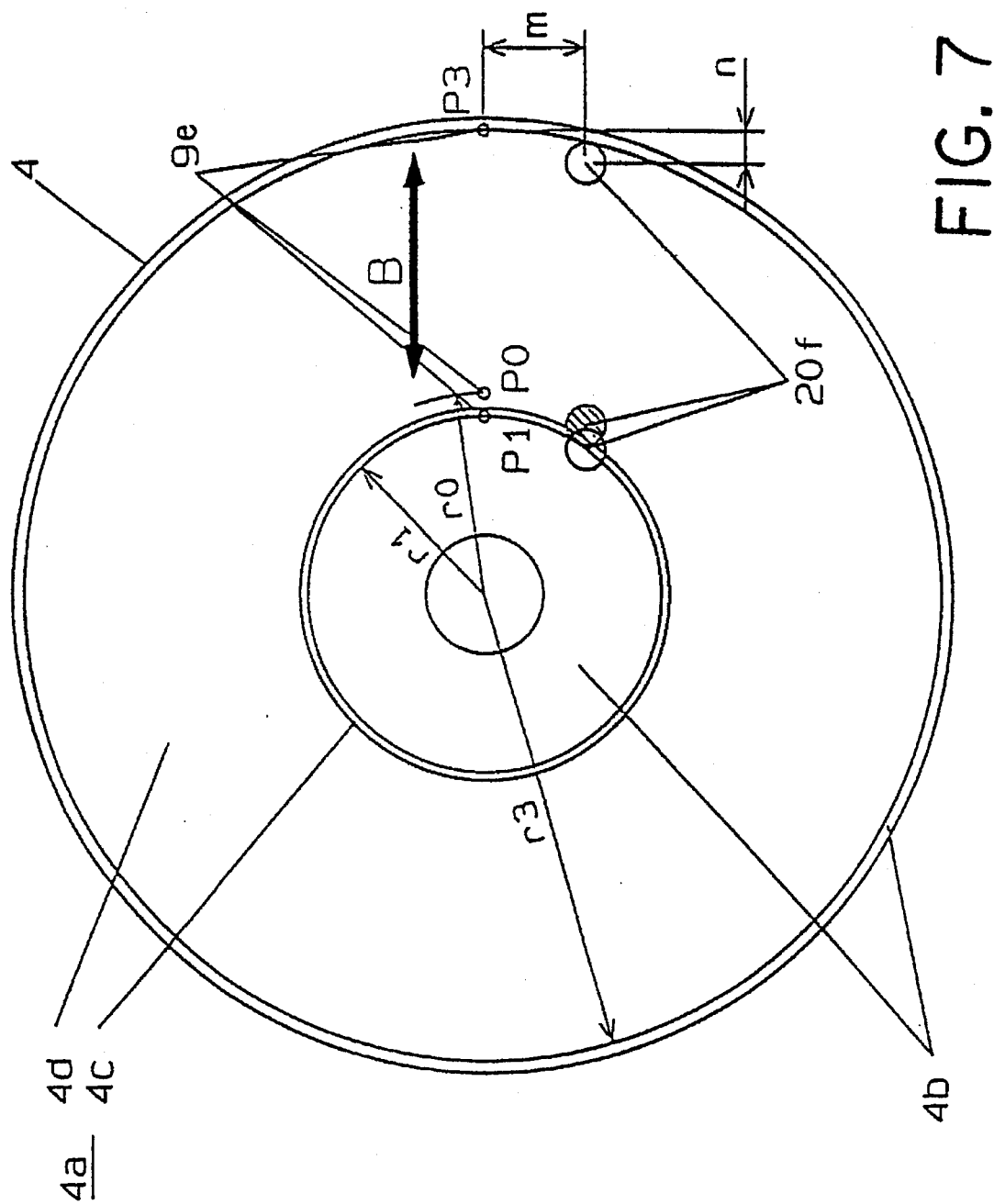
FIG. 7 is a plan view showing the positional relationship between the light spots formed by the tilt sensor and the optical pickup on the optical disk in the second example.

FIG. 6 is a cross-sectional view showing a principal portion of the optical information recording and reproducing apparatus of the second example, while FIG. 7 is a plan view showing a positional relationship between the light spots formed by the optical pickup and the tilt sensor on the optical disk. In this example, the tilt sensor is disposed in a different manner from that in the first example, and a switch for detecting the light spot formed by the optical pickup existing at or the inside of an initial tilt set position is additionally provided. In this example, an optical disk having a read-out region 4e with an extremely small width of about 5 to about 20 μm is used as the optical disk 4. Therefore, the radius r3 of the outermost track (i.e., outer circumference) of the read-out region 4e can be regarded as substantially to the radius r2 of the outermost track (outer circumference) of the program region 4d. In FIG. 7, the read-out region 4e is omitted. The same components as those in the first example will be identified by the same reference numerals, and the description thereof will be omitted herein.

In this example, the distances m and n are set so that the entire light spot formed by the tilt sensor 20 exists within the information recording region 4a when the light spot 9e of the optical pickup 9 is located on the outer circumference of the information recording region 4a, whereby widening the area of the optical disk 4 where the tilt compensation can be performed.

Also, in this example, when the optical pickup 9 moves along the radial direction B of the optical disk 4 and the light spot 9e of the optical pickup 9 enters inside an initial tilt set position P0 located in the vicinity of the innermost track of the optical disk 4, a real-time tilt compensation control is suspended and the state of the tilt compensation performed at the position P0 is maintained. The initial tilt set position P0 is a position outer to the innermost track of the read-in region 4c which is determined so that the whole of the light spot 20f exists within the information recording region 4a when the light spot 9e of the optical pickup 9 is located at the position P0. An initial tilt set position detecting switch 34 for detecting the entrance of the light spot 9e of the optical pickup 9 inside the position P0 is attached in the concave portion 5a of the auxiliary substrate 5 as shown in FIG. 6. While the light spot 9e of the optical pickup 9 is located between the position P1 on the innermost track of the read-in region 4c and the initial tilt set position P0, the optical pickup 9 is in contact with the switch 34. The switch 34 operates while in contact with the optical pickup 9. The detecting switch 34 is, for example, connected with a drive switching circuit (not shown) for the tilt motor 29. When the optical pickup 9 comes into contact with the detecting switch 34, the drive switching circuit stops the tilt motor 29.

Hereinafter, the tilt compensation operation of this example will be described.

First, the optical pickup 9 is moved to the position outer to the initial tilt set position P0, where the tilt compensation is performed. Thereafter, the optical pickup 9 is moved inward in the direction B. When the optical pickup 9 reaches the initial tilt set position P0, the initial tilt set position detecting switch 34 starts to operate, so that a so-called initial tilt setting for maintaining the tilt compensation of the optical pickup 9 at the initial tilt set position P0 is performed. When the initial tilt setting is finished, the optical pickup 9 is moved to the position P1 on the innermost track of the read-in region 4c, the information such as a directory written at the position is read, and then the recording and reproducing operations are started.

After the recording and reproducing operations are started and until the optical pickup 9 has moved to the initial tilt set position P0, the tilt compensation mechanism including the tilt motor 29 maintains the initial tilt setting state. When the optical pickup 9 has moved to the outside of the initial tilt set position P0, the operation of the detecting switch 34 is stopped. As a result, the tilt motor 29 starts to operate and a tilt compensation control for adjusting the tilt of the optical disk with respect to the optical axis of the optical pickup at real time is started. Until the light spot 9e of the optical pickup 9 has moved from the initial tilt set position P0 to the position P3 on the outermost track of the read-out region 4e, the tilt compensation control is performed.

In general, the warp of an optical disk tends to increase from the inner tracks to the outer tracks. Therefore, on the inner tracks of an optical disk, a difference between the amount of the tilt of the optical disk at a point on the disk and the amount of the tilt of the optical disk at another point which is apart from the former point by a relatively small distance, for example, about 5 mm. Therefore, as described above, if the amount of the tilt at the initial tilt set position P0 is used as the amount of the tilt at a point on the inner side of the position P0, a failure is unlikely to occur in recording and reproducing information. Consequently, in this example, the same effects as those of the first example can also attained.

Next, referring to FIG. 7, the relationship to be satisfied by the distances m and n determining the positional relationship between the light spot 9e of the optical pickup 9 and the light spot 20f of the tilt sensor 20, and a distance r0 from the center of the optical disk 4 to the initial tilt set position P0 in the apparatus of this example will be described. The initial tilt set position P0 is assumed to be distant from the point P1 on the innermost track of the read-in region 4c by 5 mm or less in the radial direction B of the optical disk 4.

When the center of the light spot 9e of the optical pickup 9 is located at the initial tilt set position P0 on the optical disk 4, the center of the light spot 20f of the tilt sensor 20 is located at a position satisfying the following relationship:

$$\{m^2+(r0-n)^2\}^{1/2} \geq r1+d/2 \qquad (3)$$

On the other hand, when the center of the light spot 9e of the optical pickup 9 is located at the position P3 on the outermost track of the information recording region 4a of the optical disk 4, the center of the light spot 20f of the tilt sensor 20 is located at a position satisfying the following relationship:

$$\{m^2+(r3-n)^2\}^{1/2} \geq r3+d/2 \qquad (4)$$

As described above, since the radius r3 indicating the distance between the center of the optical disk and the outermost track of the read-out region 4e is substantially equal to the radius r2 indicating the distance between the center of the optical disk and the outermost track of the program region 4d, the inequality (4) can be rewritten as follows:

$$\{m^2+(r2-n)^2\}^{1/2} > r2+d/2 \tag{4'}$$

In addition, the radius r0 of the track on which the initial tilt set position P0 exists and the radius r1 of the position on the inner circumference of the information recording region 4a satisfy the following relationship:

$$r0-r1 < 5 \text{ (mm)} \tag{5}$$

In order to satisfy the relationships expressed by the inequalities (3), (4)' and (5), the respective areas and distances in the optical disk 4 are set as follows: the innermost track of the read-in region 4c has the radius r1 of 22.5 mm; the outermost track of the information recording region 4a has the radius r2 of 58.5 mm ($\neq$r3); the initial tilt set position P0 is located on the track having the radius r0 of 25.5 mm; the diameter d of the light spot 20f formed by the tilt sensor 20 is set to be 5 mm; and the light spot 20f is distant from the light spot 9e formed by the optical pickup 9 by the distance m of 13 mm in the direction vertical to the radial direction B of the optical disk 4 and by the distance n of 4.1 mm in the direction B. It is noted that these values are merely an exemplary set of values satisfying the above inequalities (3), (4)' and (5), and that the positions of the respective regions and the positional relationship between the tilt sensor and the optical pickup in the optical disk are not limited to those described above.

In starting recording and/or reproducing information onto/from the optical disk, the above-mentioned initial tilt setting is performed before starting to read the information from the read-in region 4c, so that the information can be precisely read from the read-in region 4c and the information can be recorded and/or reproduced onto/from the entire information recording region 4a without causing any problems when using the apparatus. In addition, in this example, even if the widths of the read-in region and the read-out region of the optical disk are set to be extremely small, a tilt compensation control can still be performed. Therefore, in this example, a larger program region can be secured on a disk having the same size as that of the first example, so that the capacity of the optical disk can be increased. Consequently, the optical information recording and reproducing apparatus of this example is suitable for realizing a large-capacity optical disk.

The tilt angle of an optical disk with respect to the optical axis of an optical pickup is usually defined in various specifications of an optical disk, and in most cases, the angle is defined at a constant value irrespective of whether the angle is measured on the inner tracks or the outer tracks of the disk. In actuality, the tilt angle of an optical disk on the inner tracks is smaller than that on the outer tracks. However, the recording and reproduction operations can be satisfactorily performed on the inner tracks without performing a tilt compensation control in most cases, as described above.

It is possible to separately define the tilt angle of the optical disk on the inner tracks and that on the outer tracks, and regard the tilt angle on the inner tracks as a value requiring no tilt compensation. In the case of using such an optical disk requiring no tilt compensation on the inner tracks, instead of maintaining the tilt compensation state at the initial tilt set position P0 as described in this example, a standard state where the optical axis of the optical pickup 9 crosses the recording surface of an optical disk having no warp at a right angle, i.e., a standard state is preferably maintained. Than, the same effects as those described in the second example can be attained. In addition, in such a case, after the recording and/or the reproduction are/is finished, the optical pickup 9 can be maintained in the standard state. Therefore, when the recording and/or the reproduction of the information for an optical disk are/is started again, the information in the read-in region can be immediately read under the standard state, so that the rising time required for starting the recording and/or the reproduction of the information can be shortened.

EXAMPLE 3

Next, an optical disk according to the present invention will be described with reference to FIG. 8.

Figure 8:
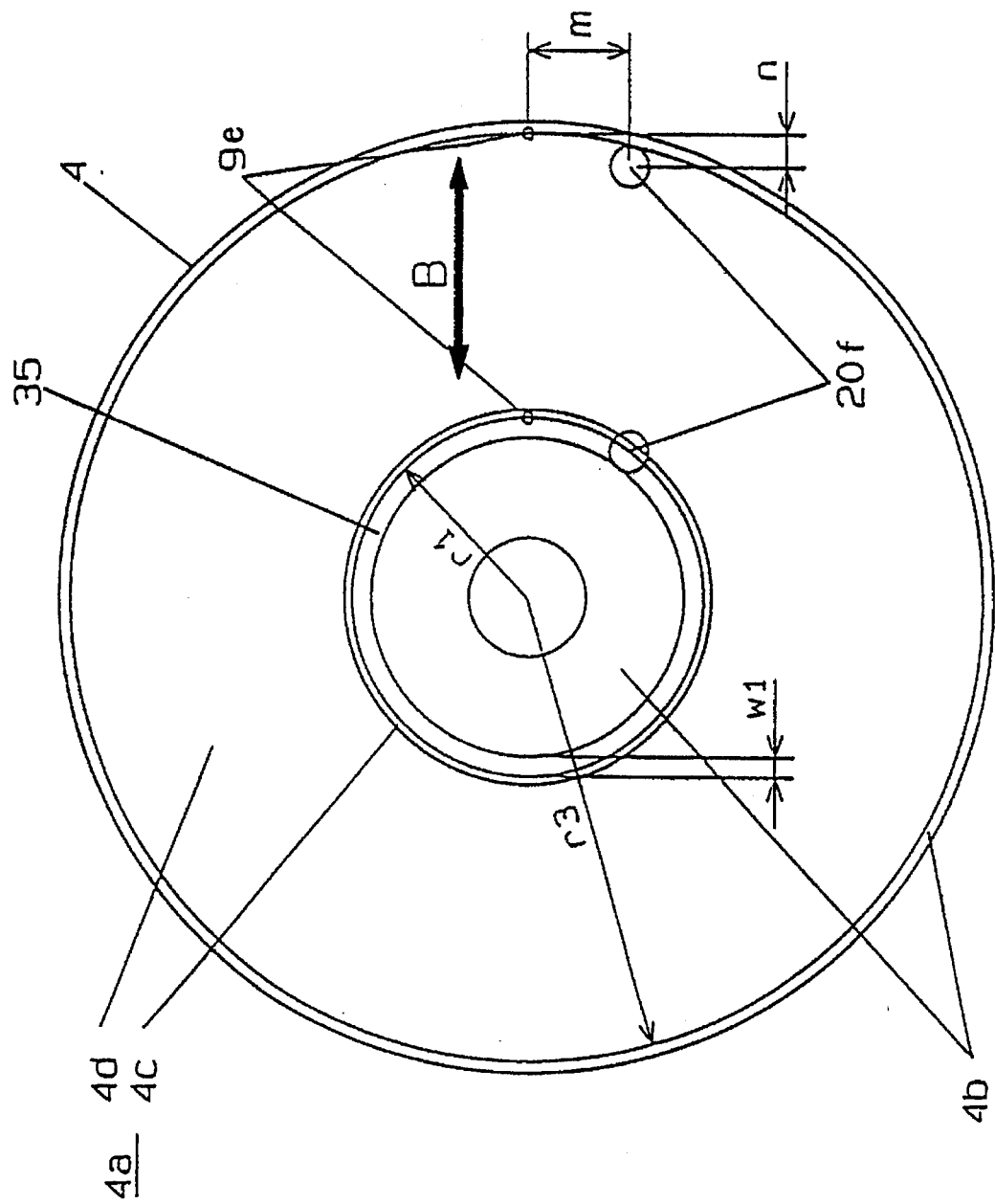
FIG. 8 is a plan view schematically showing an optical disk according to the present invention.

FIG. 8 is a plan view schematically showing an optical disk of the present invention. As shown in FIG. 8, the optical disk of this example further includes an inner tilt detection region 35 which is provided on the inner side of the read-in region 4c. The inner tilt detection region 35 consists of pit or grooves and has a width w1. Since the inner tilt detection region 35 is used for detecting the tilt or the inclination of the optical disk, the pits or the grooves in the region are not required to be formed with high precision unlike those in the information recording region 4a. The same components as those described in the first and the second examples will be identified by the same reference numerals and the description thereof will be omitted herein. In addition, the read-out region 4e is not shown in FIG. 8, because the width of the region 4e is extremely small compared with other regions similar to those in the Example 2.

The width w1 of the inner tilt detection region 35 is determined so that the entire light spot 20f of the tilt sensor 20 is located within at least one of the inner tilt detection region 35 and the information recording region 4a when the light spot 9e of the optical pickup 9 is located on the innermost track of the read-in region 4c. On the other hand, when the light spot 9e of the optical pickup 9 is located on the outermost track of the read-out region 4e, the entire light spot 20f of the tilt sensor 20 is located within the information recording region 4a of the optical disk 4 as described in the first and the second examples.

More specifically, the diameter d of the light spot 20f formed by the tilt sensor 20; the distances m and n between the light spot 9e formed by the optical pickup 9 and the light spot 20f; the radii r1 and r3 of the innermost and outermost tracks of the information recording region 4a, respectively; and the width w1 of the inner tilt detection region 35 are determined so as to satisfy the following relationships.

$$\{m^2+(r1-n)^2\}^{1/2} > r1-w1+d/2 \tag{6}$$

$$\{m^2+(r3-n)^2\}^{1/2} > r3-d/2 \tag{7}$$

In order to satisfy the relationships expressed by the inequalities (6) and (7), the respective regions and distances in the optical disk 4 are set as follows: the innermost track of the read-in region 4c has the radius r1 of 22.5 mm; the outermost track of the Information recording region 4a (or the read-out region 4e) has the radius r3 of 58.5 mm; the width w1 of the inner tilt detection region 35 is set to be 2.5 mm; the diameter d of the light spot 20f formed by the tilt sensor 20 is set to be 5 mm; and the light spot 20f is distant from the light spot 9e formed by the optical pickup 9 by the distance m of 13 mm in the direction vertical to the radial direction B of the optical disk 4 and by the distance n of 4.1 mm in the direction B. It is noted that these values are merely an exemplary set of values satisfying the above inequalities (6) and (7), and that the positions of the respective regions and the positional relationship between the tilt sensor and the optical pickup in the optical disk are not limited to those described above.

In the case where the respective regions of the optical disk are set at the above values, the inner circumference of the inner tilt detection region 35 has a radius of about 20 mm. In an optical disk having a diameter of 130 mm or less, the pits or the grooves can be provided by cutting the region which is distant from the center of the optical disk by the radius of at least about 18 mm. Therefore, the provision of such an inner tilt detection region causes no problems in the production process.

In such an optical disk provided with an inner tilt detection region, the tilt compensation can be performed in the entire region of the information recording region 4a of the optical disk 4. Moreover, in an optical information recording and reproducing apparatus including the tilt sensor for such an optical disk, it is no longer necessary to provide a section for maintaining the tilt compensation state on the inner tracks of the initial tilt set position or a section for maintaining a standard state described in the second example. As a result, a high-density recording operation can be performed by using an apparatus having a simplified configuration.

In this example, when the center of the light spot 9e of the optical pickup 9 is located on the outermost track of the information recording region 4a or that of the read-out region 4e, the positional relationship between the tilt sensor 20 and the optical pickup 9 is determined so that the entire light spot 20f of the tilt sensor 20 is located within the information recording region 4a. However, depending upon the specifications of an optical disk, the width of the inner tilt detection region cannot be set to be large. In such a case, if the entire light spot 20f of the tilt sensor 20 is located within the information recording region 4a when the center of the light spot 9e of the optical pickup 9 is not located on the outermost track of the read-out region 4e but on the outermost track of the program region 4d, then the width of the inner tilt detection region can be reduced.

EXAMPLE 4

In the foregoing examples, the range in which the information recording region is provided is regarded as the same on different disks. However, among various specifications of an optical disk, standards in which the information recording region is located in a fixed region of the recording surface, and standards in which the outermost track of the information recording region can be varied in accordance with the amount of information existing. In the latter case, if the tilt compensation control is performed for an optical disk including an information recording region of a small area, then a part of the light beam emitted from the tilt sensor enters the mirror portion on the outside of the information recording region, so that an erroneous tilt compensation control is performed and a failure is caused in the recording and the reproduction operations.

Hereinafter, another optical disk according to the present invention will be described with reference to FIG. 9. The optical disk of this example is in compliance with a standard on which the range of the information recording region can be varied.

Figure 9:
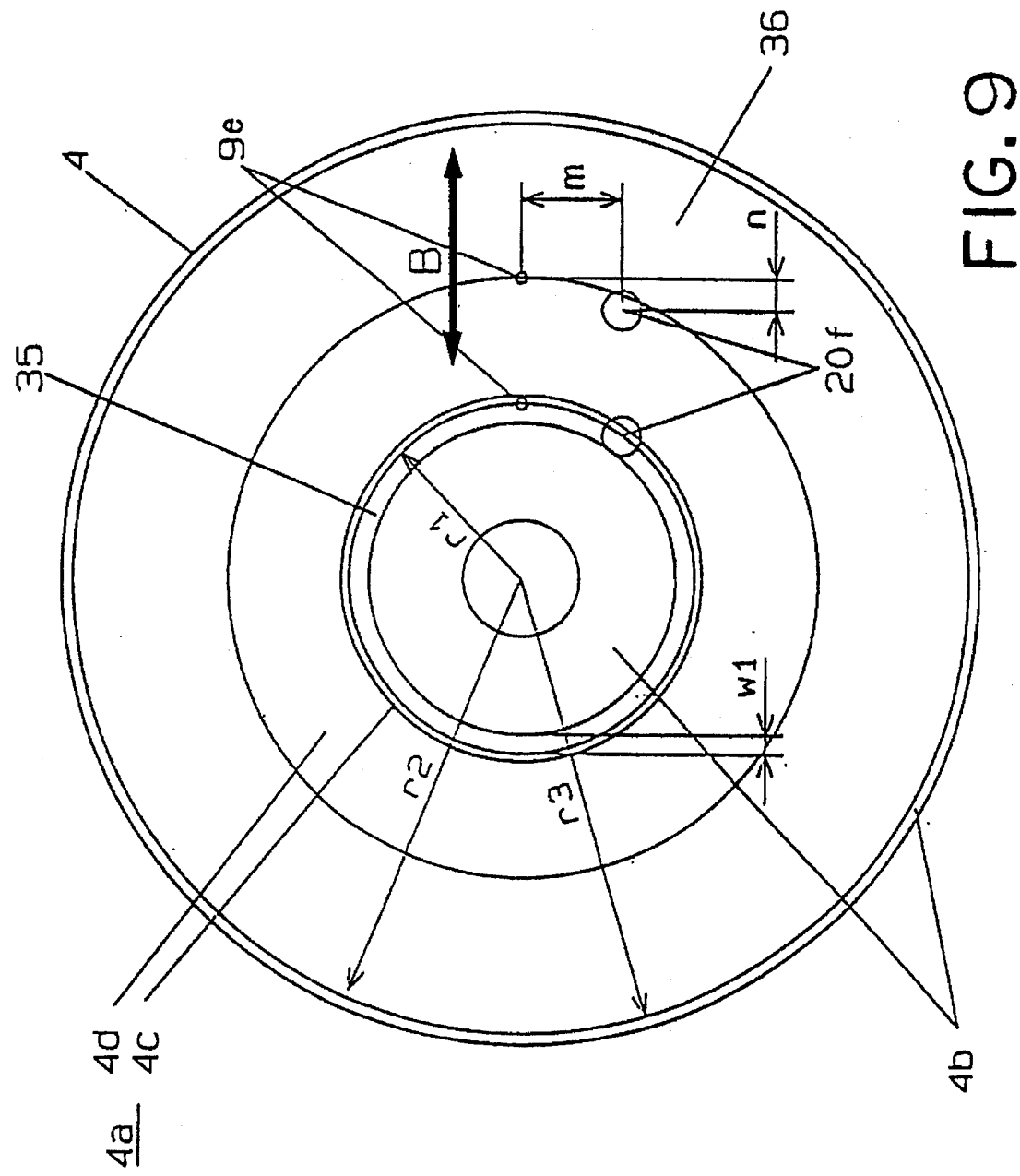
FIG. 9 is a plan view schematically showing another optical disk according to the present invention.

FIG. 9 is a plan view schematically showing the optical disk of this example. In this example, the position of the outermost track of the information recording region 4a is variable in respective optical disks 4. However, according to the standard, when the area of the information recording region 4a is set to be maximum, the region 4a is located in the range as shown in FIG. 8, that is to say, the outer circumference of the region is distant from the center of the optical disk by the radius r3. As shown FIG. 9, in the optical disk of this example, the information recording region 4a occupies a part of the maximal recording region of which the outer circumference has the radius r3 as shown in FIG. 8. Inside the information recording region 4a, the inner tilt detection region 35 is formed like the optical disk of the third example; and outside the information recording region 4a, an outer tilt detection region 36 having pits or grooves formed thereon is provided so as to reach the outer circumference of the maximal recording region.

The optical disk of this example is the same as the optical disk of the third example except that the outer tilt detection region 36 is provided. Also, the positions on the inner circumference or the outer circumference of the respective regions and the positional relationship between the light spot 9e formed by the optical pickup 9 and the light spot 20f formed by the tilt sensor 20 are determined so as to satisfy the inequalities (6) and (7) described in the third example. Therefore, in the optical disk of this example, when the light spot 9e of the optical pickup 9 is located within the information recording region 4a, the entire light spot 20f of the tilt sensor 20 is located within the information recording region 4a where the pits or the grooves are formed; the inner tilt detection region 35; and the outer tilt detection region 36. As a result, a tilt compensation control can be performed stably.

In this example, the outer tilt detection region is formed so as to substantially reach the outer circumference of a maximal recording region on an optical disk. However, the range where the outer tilt detection region is formed is not limited thereto. As long as the entire light spot of the tilt sensor is located in any region having the pits or the grooves when the light spot of the optical pickup is located within the information recording region, it is possible to vary the width of the outer tilt detection region in accordance with the position of the outer circumference of the information recording region. This reduces the time required by cutting an optical disk.

EXAMPLE 5

Next, a tilt sensor according to the present invention will be described.

FIG. 10A is a cross-sectional view showing a configuration for a tilt sensor 40 of this example. The tilt sensor 40 includes: a light-emitting diode functioning as a light source (not shown) for emitting a light beam; a pair of photodiodes (not shown, either) functioning as a pair of light receiving elements for receiving a light beam reflected by an optical disk 4 so as to generate an electric signal in accordance with the amount of the received light; and an aspheric lens 41 for substantially collimating the light beam emitted from the light-emitting diode. The light-emitting diode and the pair of photodiodes are disposed on a base 45 of the tilt sensor 40 so as to face the optical disk 4. The pair of photodiodes are aligned in the radial direction B of the optical disk.

The tilt sensor 40 of this example further includes a slit plate 42 having an aperture 43. The aperture 43 is small enough to limit the diameter of the light beam passing therethrough. The slit plate 42 As engaged with the outer circumference of the aspheric lens 41 and is attached to the base 45. As shown in FIGS. 10A and 10B, the aperture 43 serves as a diaphragm and limits the width of the light beam emitted from the tilt sensor 40 in the radial direction B of the optical disk 4. As a result, as shown in FIG. 11, the width of the light spot 40a of the light beam irradiated from the tilt sensor 40 onto the optical disk 4 becomes smaller than the width of the light spot formed by the tilt sensor in the first and the second examples by the width indicated by the hatching in FIG. 11. Therefore, even when the light spot 40a of the tilt sensor 40 is moved to the vicinity of the innermost track or the outermost track of the information recording region 4a, the light spot 40a is unlikely to enter the mirror portion 4b. Consequently, as compared with the cases of using the tilt sensors of the foregoing examples, the tilt of the optical disk 4 can be detected in a wider range, thereby enlarging the region where the tilt compensation control can be performed.

In addition, in the tilt sensor 40 of tits example, a sawtooth-shaped rugged portion 44 is formed on the inner surface of the slit plate 42 facing the aspheric lens 41. The light beam shielded by the slit plate 42 is reflected by the slopes of the rugged portion 44 to the direction indicated by the arrow Q in FIG. 10A. This rugged portion is provided in order to prevent the light beam reflected by the surface of the slit plate 42 facing the aspheric lens 41 from being incident onto the tilt sensor 40. Some of the light beams shielded by the slit plate 42 are turned into stray beams and then are directly incident onto the tilt sensor 40. If such stray beams are incident onto the tilt sensor 40, the precision in detecting the tilt angle of the optical disk is degraded. Therefore, in this example, the rugged portion 44 is provided in order to eliminate such stray beams, thereby detecting the tilt angle of the optical disk with high precision.

Alternatively, by providing an antireflection coating on the surface of the slit plate 42 facing the aspheric lens 41, instead of the rugged portion 44, the same effects can be attained. For forming such an antireflection coating, a method for painting the surface in frosted black is generally used. However, any coating material can be used so long as the material has an antireflection effect for light.

In this example, the slit plate 42 is integrated with the tilt sensor 40 by attaching the slit plate 42 to the base 40a. Alternatively, the slit plate 42 can be fixed on the plane of the optical pickup 9 on which the tilt sensor 40 is installed. However, by attaching the slit plate 42 to the base 45, the space can be saved and a compact unit can be formed. Therefore, such a construction is effective in reducing the size of the unit and simplifying the assembling process thereof.

The tilt sensor 40 is installed on the optical pickup (not shown) in this example. The arrangement of the tilt sensor 40 is not limited thereto. The tilt sensor can be disposed so that a light spot is formed by the tilt sensor at a position deviated from the light spot formed by the optical pickup in a direction substantially vertical to the radial direction of the optical disk like a conventional tilt sensor, or can be disposed at the position described in the first and the second examples.

Next, referring to FIGS. 12A and 12B, another aperture for limiting the width of the light beam emitted from the light source of the tilt sensor will be described as a modified example of Example 5.

Figure 12A:
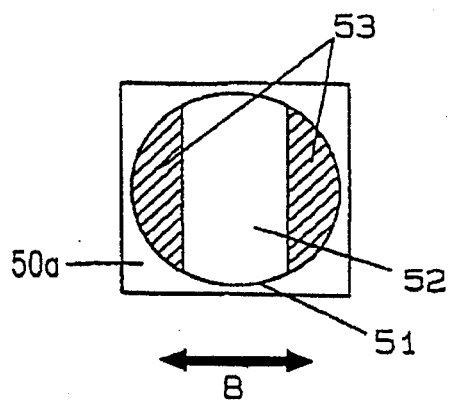
Figure 12B:
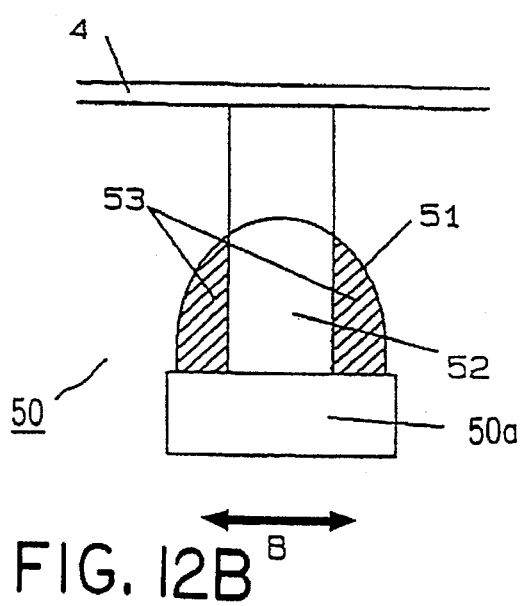
FIG. 12B is a side view thereof.

FIG. 12A is a plan view of the tilt sensor of this modified example and FIG. 12B is a side view thereof. As shown in FIGS. 12A and 12B, in this modified example, an aperture 52 for transmitting the light beam emitted from the light-emitting diode (not shown) and light beam non-transmitting portions 53 painted in frosted black are provided on the surface of the aspheric lens 51 formed on the base 50a of the tilt sensor 50. The aperture 52 is formed by providing the light beam non-transmitting portions 53 on both sides thereof. As a result, the slit plate 42 described in the fifth example is no longer necessary. That is to say, in this modified example, it is possible to widen the range in which the tilt angle of the optical disk can be detected by utilizing a simplified configuration where the number of the components is reduced.

In this modified example, the light beam non-transmitting portions 53 are formed by partially painting the surface of the aspheric lens 51 in frosted black. However, the portions can be formed by any method so long as the portions can shield the light beam. For example, an optical coating film such as a wavelength filter, through which light having a wavelength equal to the emission wavelength of the light emitted from the light-emitting diode (light source of the tilt sensor 50) is not transmitted, can be provided.

Next, referring to FIGS. 13A and 13B, still another aperture for limiting the width of the light beam emitted from the light source of the tilt sensor will be described as another modified example of Example 5.

Figure 13A:
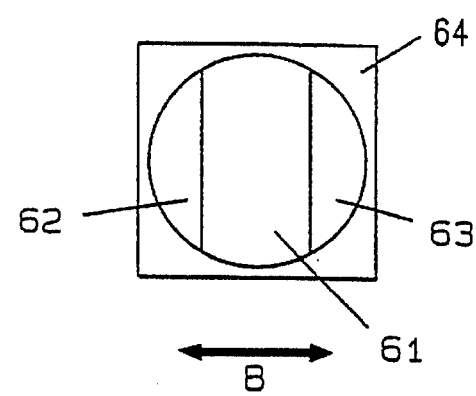
Figure 13B:
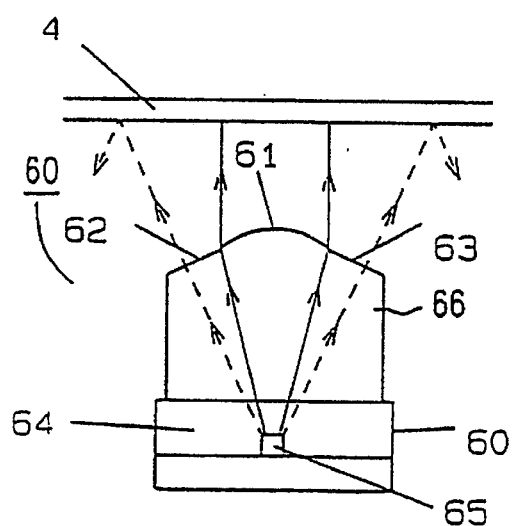
FIG. 13B is a side view thereof.

FIG. 13A is a plan view of the tilt sensor 60 of this modified example and FIG. 13B is a side view thereof. As shown in FIGS. 13A and 13B, the tilt sensor 60 includes: an aspheric lens 61 formed on a base portion 64; and prism portions 62 and 63. The aspheric lens 61 and the prism portions 62 and 63 are integrally formed, and the prism portions 62 and 63 ere disposed on both sides of the aspheric lens 61 in the radial direction B of the optical disk 4. In this modified example, the aspheric lens 61 and the prism portions 62 and 63 are continuously formed on one of the faces of a block 66 made of a light-transmissive material such as fused quartz (quartz glass).

In such a configuration, when the light beam emitted from the light-emitting diode 65 functioning as a light source is incident onto the light-transmissible block 66, a part of the light beam incident onto the aspheric lens 61 is substantially collimated. The collimated light is irradiated onto the optical disk 4, and is reflected by the optical disk 4 toward the tilt sensor 60. On the other hand, the remaining part of the light beam incident onto the prism portions 62 and 63 is irradiated onto the optical disk 4 while maintaining the an angle thereof at which the light beam is divergently emitted from the light-emitting diode 65. In other words, the prism portions 62 and 63 make the light beam emitted from the light-emitting diode 65 obliquely incident onto the optical disk 4, not in a vertical direction thereto. As a result, as shown in FIG. 13B, the light beams transmitted through the prism potions 62 and 63 are reflected by the optical disk 4 toward the directions going away from the tilt sensor 60. Accordingly, the light beams transmitted through the prism portions 62 and 63 and reflected by the optical disk 4 are not incident onto the light receiving elements (not shown) of the tilt sensor 60. Therefore, the tilt angle of the optical disk 4 is detected only by the light beam transmitted through the aspheric lens 61, and the same effects as those obtained by the tilt sensor of the fifth example can be attained.

In addition, in this modified example, it is possible to prevent the reflected light which is not used for detecting the tilt angle of the optical disk 4 from being incident onto the tilt sensor 60, so that the generation of the stray light can be prevented. Furthermore, since the aspheric lens 61 and the prism portions 62 and 63 are integrally and continuously formed, these portions can be formed by integrally molding a resin. As a result, the fabrication process of these portions can be simplified.

EXAMPLE 6

Next, a still another tilt sensor according to the present invention will be described. The tilt sensor of this example is suitably used for a phase change type optical disk.

Figure 14:
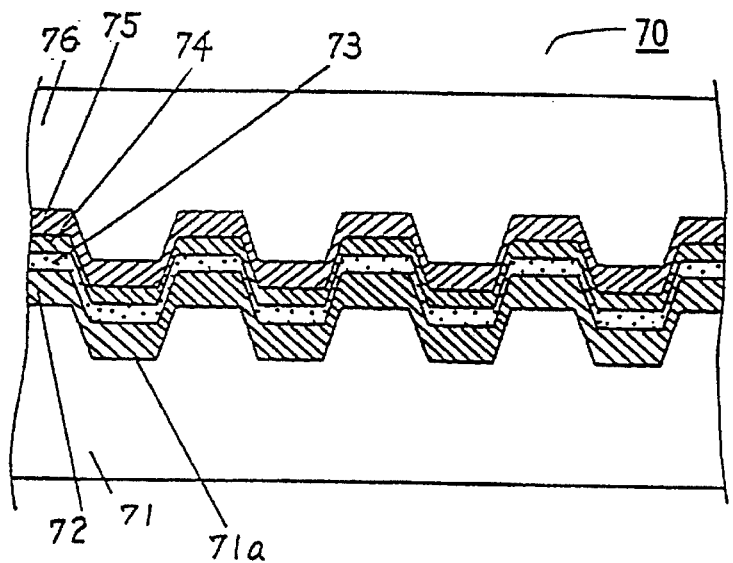
FIG. 14 is an enlarged cross-sectional view showing the layered-structure of a phase change type optical disk.

Before describing the structure of the tilt sensor of this example, a phase change type disk optical disk will first be described. FIG. 14 is an enlarged cross-sectional view of a phase change type optical disk 70. The phase change type optical disk 70 includes a substrate 71, and spiral tracks for guiding laser light are formed on the surface 71a of the substrate 71. On the surface 71a of the substrate 71, a recording thin film 73 is formed so as to be sandwiched between a first protective layer 72 and a second protective layer 74. The phase of the recording thin film 73 is changed by the laser irradiation, and the thin film falls into a state where constants indicative of optical properties, such as a refractive index n and an attenuation coefficient k are different. A reflective layer 75 is provided on the second protective layer 74, and a protective substrate 76 is further provided on the reflective layer 75. The laser light for recording and reproducing is incoming from the side of the substrate 71.

The substrate 71 is made of polycarbonate. The first and the second protective layers 72 and 74 are made of a material such as ZnS-20 mol % $SiO_2$. The materials of the substrate 71 and the protective layers 72 and 74 are not limited to those mentioned above. The recording thin film 73 can be made of any material so long as the phase of the material can be reversely changed between a crystalline state and an amorphous state. In this example, the thin film 73 is made of $Ge_2Sb_2Te_5$. The reflective layer 75 is provided for improving the efficiency in absorbing light into the recording thin film 73, and is made of Au, for example. By controlling the thicknesses of the respective layers, a phase change type optical disk 70 suitable for the laser emission wavelength can be obtained.

Figure 15:
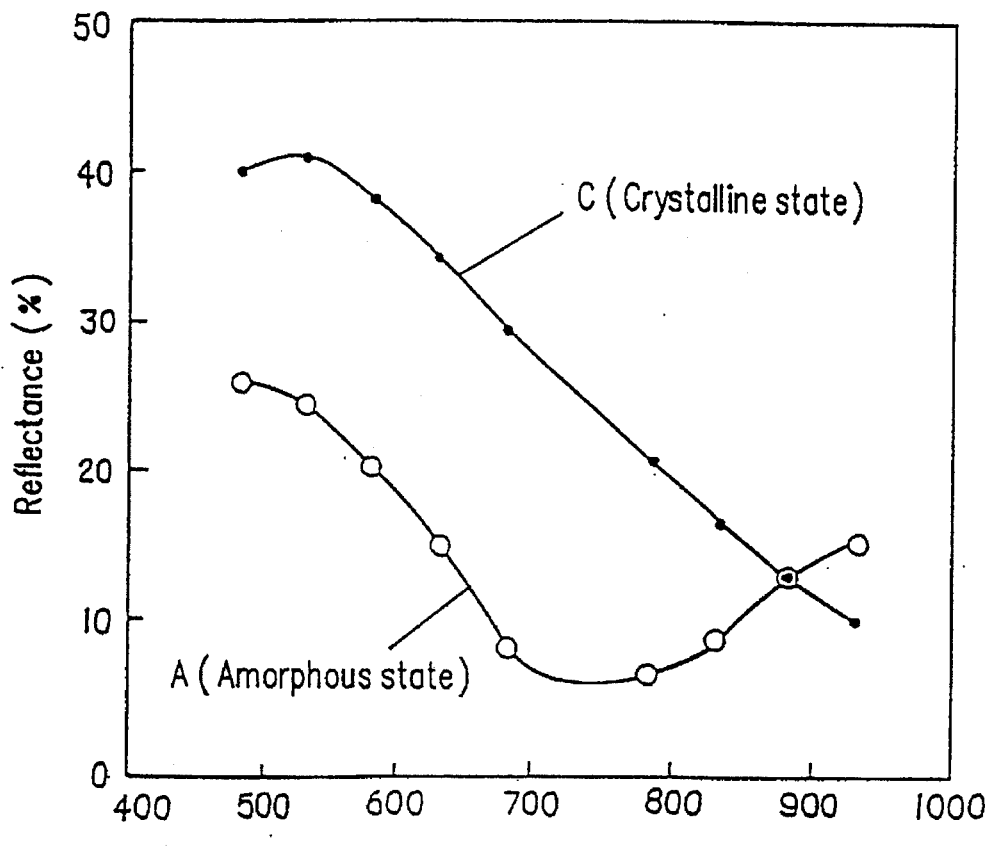
FIG. 15 is a graph showing the spectral reflection distribution characteristics of the phase change type optical disk in a crystalline state and an amorphous state.

FIG. 15 is a graph showing the spectral reflection distribution characteristics of an exemplary phase change type optical disk 70 suitable for a light having wavelength of 680 nm. In FIG. 15, the spectral reflection distribution characteristics when the recording thin film 73 is in a crystalline state are shown by the curve C, while the spectral reflection distribution characteristics when the recording thin film 73 is in an amorphous state are shown by the curve A. As shown in FIG. 15, the spectral reflection distribution characteristics of the phase change type optical disk 70 has a wavelength dependence. In this optical disk 70, the reflectance for the light having a wavelength of 880 nm is approximately the same both in the crystalline state and the amorphous state.

The tilt sensor of this example utilizes the wavelength dependence of the spectral reelection distribution characteristics. That is, the wavelength of the light beam emitted from the tilt sensor is set to be substantially equal to the wavelength where the reflectances of the optical disk 70 in the crystalline state and the amorphous state are equal to each other. More specifically, if the phase change type optical disk 70 is designed to be recorded and/or reproduced by the laser light having a wavelength of 680 nm, then the wavelength of the light beam emitted from the tilt sensor of this example is set to be 880 nm.

In this example, in order to set the wavelength of the light beam emitted from the tilt sensor at such a value, a light-emitting diode having a peak wavelength of about 880 nm is used as the light source of the tilt sensor, and the aspheric lens is made of a resin for selectively transmitting light having a wavelength of 880 nm.

By using a tilt sensor in which the wavelength of the light beam emitted therefrom is set at such a value, the tilt of the phase change type disk can be precisely detected even in the boundary between the crystalline portion and the amorphous portion. Therefore, in an optical information recording and reproducing apparatus using the tilt sensor of this example, the recording and reproducing operations can be performed while performing a tilt compensation control for the phase change type optical disk, so that the information can be recorded at a higher density as compared with a conventional apparatus. In addition, according to the present invention, the tilt of various optical disks, such as a CD or a CD-ROM, other than the phase change type optical disk can be detected without causing any problems.

In this example, the case is explained where the wavelength is 880 nm when the difference between the reflectance in the crystalline portion of the phase change type optical disk and that in the amorphous portion thereof becomes zero. Needless to say, the wavelength is not limited thereto.

In the case of using a phase change type optical disk, if the tilt sensor of this example is used in place of the tilt sensors described in the fifth example and the modified examples thereof, a tilt compensation control can be stably performed even when the phase change type optical disk has a diameter of 130 mm or less.

Also, if the tilt sensor of this example is mounted on an optical pickup as described in the first and the second examples, a tilt compensation control can be performed with even higher precision.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tilt sensor for irradiating an optical disk with a light beam and detecting a tilt of the optical disk with respect to an optical pickup based on the light beam reflected from the optical disk, the optical disk being of a phase change type having crystallized portions and amorphous portions, the tilt sensor comprising:

a light source for emitting divergent light;

at least a pair of light receiving elements for receiving the reflected light beam and outputting signals used for obtaining a signal indicative of the tilt of the optical disk in accordance with the light amount of the received light beam, the light receiving elements being arranged in a predetermined direction; and collimating means for converting the divergent light by transmitting the divergent light to a substantially collimated light and for directing the substantially collimated light to the optical disk as the light beam;

wherein the light source emits the divergent light having a wavelength in a predetermined range substantially equal to a wavelength where a reflectance at the crystallized portions is substantially equal to that at the amorphous portions.

2. The tilt sensor of claim 1 further comprising diaphragm means for limiting the width of the light beam in the predetermined direction.

3. The tilt sensor of claim 2, wherein the diaphragm means includes a slit plate having an opening provided in the vicinity of a region of the collimating means where the light beam exits.

4. The tilt sensor of claim 2 further comprising a lens provided on an optical path of the divergent light emitted from the light source, the lens including a light transmitting portion for allowing a part of the divergent light to pass therethrough and a light interrupting portion for interrupting the remaining part of the divergent light, wherein the light transmitting portion serves as the collimating means and the light interrupting serves as the diaphragm means.

* * * * *

UNITED STATES PATENT AND TRADEMARK OFFICE
CERTIFICATE OF CORRECTION

PATENT NO.    : 5,657,303

DATED         : August 12, 1997

INVENTOR(S)   : Yoshiteru Namoto et al.

It is certified that error appears in the above-identified patent and that said Letters Patent is hereby corrected as shown below:

Column 1, line 62, change "(not shown). through" to --(not shown) through--.

Column 2, line 24, change "than" to --then--.

Column 2, line 32, change "ere" to --are--.

Column 2, line 33, change "ere" to --are--.

Column 2, line 55, change "e" to --a--.

Column 3, line 34, insert --to-- between "perpendicular" and "the".

Column 3, line 37, change "e" to --a--.

Column 4, lines 17-18, delete --causes no problems even when the warp of the optical disk-- between "The" and "optical system".

Column 10, line 18, change "FIG. 12a" to --FIG. 12A--.

Column 10, line 18, change "showings" to --showing".

Column 10, line 22, change "showings" to --showing--.

Column 11, line 9, change "or" to --of--.

UNITED STATES PATENT AND TRADEMARK OFFICE
CERTIFICATE OF CORRECTION

PATENT NO. : 5,657,303

DATED : August 12, 1997

INVENTOR(S) : Yoshiteru Namoto et al.

It is certified that error appears in the above-identified patent and that said Letters Patent is hereby corrected as shown below:

Column 12, lines 2-3, insert --is-- between "sensor base 22" and "installed".

Column 12, line 46, change "and" to --end--.

Column 12, line 59, insert --to-- between "unnecessary" and "set".

Column 13, line 1, change "rotors" to --rotate--.

Column 13, line 53, relationship (1), change "$\{m^2 + r1 - n)^2\}^{1/2} > r1 + d/2$" to --$\{m^2 + (r1 - n)^2\}^{1/2} > r1 + d/2$--.

Column 13, line 61, relationship 2, change "$\{m^2 + r2 - n)^2\}^{1/2} > r2 + d/2$" to --$\{m^2 + (r2 - n)^2\}^{1/2} < r3 - d/2$--.

Column 14, line 1, change "expresses" to --expressed--.

Column 16, line 55, relationship (3), change "$\{m^2 + (r0 - n)^2\}^{1/2} > r1 + d/2$" to --$\{m^2 + (r0 - n)^2\}^{1/2} > r1 + d/2$--.

Column 16, line 63, relationship (4), change "$\{m^2 + (r3 - n)^2\}^{1/2} > r3 + d/2$" to --$\{m^2 + (r3 - n)^2\}^{1/2} < r3 - d/2$--.

Column 17, line 6, relationship (4'), change "$\{m^2 + (r2 - n)^2\}^{1/2} > r2 + d/2$" to --$\{m^2 + (r2 - n)^2\}^{1/2} < r2 - d/2$--.

UNITED STATES PATENT AND TRADEMARK OFFICE
CERTIFICATE OF CORRECTION

PATENT NO. : 5,657,303

DATED : August 12, 1997

INVENTOR(S) : Yoshiteru Namoto et al.

It is certified that error appears in the above-identified patent and that said Letters Patent is hereby corrected as shown below:

Column 17, line 19, change "($\neq$ r3)" to --($\doteqdot$ r3)--.

Column 18, line 3, change "Than" to --Then--.

Column 20, line 65, change "As" to --is--.

Column 21, line 17, change "tits" to --this--.

Signed and Sealed this

Twentieth Day of January, 1998

Attest:

BRUCE LEHMAN

Attesting Officer

Commissioner of Patents and Trademarks